(12) United States Patent
Deshmukh et al.

(10) Patent No.: US 12,041,089 B2
(45) Date of Patent: Jul. 16, 2024

(54) CLOUD ACCESS SECURITY BROKER USER INTERFACE SYSTEMS AND METHODS

(71) Applicant: Zscaler, Inc., San Jose, CA (US)

(72) Inventors: Pooja Deshmukh, Sunnyvale, CA (US); Iris Gao, Milpitas, CA (US); Jasbir S. Kaushal, Sunnyvale, CA (US); Sarthak Saxena, Bareilly (IN)

(73) Assignee: Zscaler, Inc., San Jose, CA (US)

( * ) Notice: Subject to any disclaimer, the term of this patent is extended or adjusted under 35 U.S.C. 154(b) by 227 days.

(21) Appl. No.: 16/950,136

(22) Filed: Nov. 17, 2020

(65) Prior Publication Data
US 2022/0109696 A1    Apr. 7, 2022

(30) Foreign Application Priority Data
Oct. 1, 2020    (IN) .............................. 202011042847

(51) Int. Cl.
*H04L 9/40* (2022.01)
*H04L 43/045* (2022.01)
*H04L 43/06* (2022.01)
*H04L 67/562* (2022.01)

(52) U.S. Cl.
CPC ............ *H04L 63/20* (2013.01); *H04L 43/045* (2013.01); *H04L 43/06* (2013.01); *H04L 63/145* (2013.01); *H04L 67/562* (2022.05)

(58) Field of Classification Search
CPC ..... H04L 63/20; H04L 43/045; H04L 63/145; H04L 37/562
USPC ...................................... 726/1; 709/224, 229
See application file for complete search history.

(56) References Cited

U.S. PATENT DOCUMENTS

| | | | |
|---|---|---|---|
| 8,185,510 B2 | 5/2012 | Chaudhry et al. |
| 8,429,111 B1 | 4/2013 | Kailash et al. |
| 8,869,259 B1 | 10/2014 | Udupa et al. |
| 8,887,249 B1 | 11/2014 | Schekochikhin et al. |

(Continued)

OTHER PUBLICATIONS

Help Net Security, Jun. 9, 2015: 90% of DLP violations occur in cloud storage apps; https://web.archive.org/web/20221202141142/ https://www.helpnetsecurity.com/2015/06/09/90-of-dlp-violations-occur-in-cloud-storage-apps/ (Year: 2015).*

(Continued)

*Primary Examiner* — Davoud A Zand
(74) *Attorney, Agent, or Firm* — Baratta Law PLLC; Lawrence A. Baratta, Jr.; Ryan Odessa

(57) ABSTRACT

Systems and methods include, responsive to a scan by the CASB system of a plurality of users associated with a tenant in a Software-as-a-Service (SaaS) application where the scan includes identifying malware in content in the SaaS application and performing Data Loss Prevention (DLP) in the content in the SaaS application, maintaining records associated with a plurality of incidents for the malware and the DLP; providing a User Interface (UI) for the tenant including an analytics view with a plurality of summary tiles including visualizations of the plurality of incidents for the malware and the DLP for the tenant; and providing the UI for the tenant including a table listing any of the plurality of incidents for the malware and the DLP for the tenant, including any of unique data objects, unique users internal to the tenant, and unique external entities, associated with the plurality of incidents.

20 Claims, 42 Drawing Sheets

(56) References Cited

U.S. PATENT DOCUMENTS

| | | |
|---|---|---|
| 9,152,789 B2 | 10/2015 | Natarajan et al. |
| 9,154,475 B1 | 10/2015 | Kailash et al. |
| 9,473,537 B2 | 10/2016 | Sinha et al. |
| 9,609,015 B2 | 3/2017 | Natarajan et al. |
| 10,523,710 B2 | 12/2019 | Sinha et al. |
| 2017/0142068 A1* | 5/2017 | Devarajan ............. H04L 67/146 |
| 2017/0223029 A1* | 8/2017 | Sharma ............... H04L 63/1425 |
| 2018/0027006 A1* | 1/2018 | Zimmermann ..... H04L 63/0227 726/11 |
| 2018/0183827 A1* | 6/2018 | Zorlular .................. H04L 41/06 |
| 2018/0191771 A1* | 7/2018 | Newman ............... G06F 21/552 |
| 2018/0267947 A1* | 9/2018 | Miller ................... G06F 40/174 |
| 2018/0278505 A1* | 9/2018 | Sarin ..................... G06F 21/604 |
| 2021/0136089 A1* | 5/2021 | Costea .................. G06F 21/554 |

OTHER PUBLICATIONS

Tahboub et al., "Data Leakage/Loss Prevention Systems (DLP)", Oct. 24, 2014, IEEE, 2014 World Congress on Computer Applications and Information Systems (WCCAIS) (2014, pp. 1-6) (Year: 2014).*

* cited by examiner

850

```
┌─────────────────────────────────────────────────────────┐
│ CAUSING A SCAN BY THE CASB SYSTEM OF A PLURALITY OF     │
│ USERS ASSOCIATED WITH A TENANT IN A SOFTWARE-AS-A-      │──851
│ SERVICE (SAAS) APPLICATION WHERE THE SCAN INCLUDES      │
│ ANY OF IDENTIFYING MALWARE IN CONTENT IN THE SAAS       │
│ APPLICATION AND IDENTIFYING CONFIDENTIAL DATA IN THE    │
│ CONTENT IN THE SAAS APPLICATION                         │
└─────────────────────────────────────────────────────────┘
                             │
                             ▼
┌─────────────────────────────────────────────────────────┐
│ DURING THE SCAN WHICH IS COVERING HISTORICAL DATA IN    │──852
│ THE SAAS APPLICATION, RECEIVING NOTIFICATIONS OF THE    │
│ CONTENT BEING ACTIVELY MODIFIED BY ANY OF THE           │
│ PLURALITY OF USERS                                      │
└─────────────────────────────────────────────────────────┘
                             │
                             ▼
┌─────────────────────────────────────────────────────────┐
│ INCLUDING THE CONTENT BEING ACTIVELY MODIFIED IN THE    │──853
│ SCAN WITH THE HISTORICAL DATA                           │
└─────────────────────────────────────────────────────────┘
                             │
                             ▼
┌ ─ ─ ─ ─ ─ ─ ─ ─ ─ ─ ─ ─ ─ ─ ─ ─ ─ ─ ─ ─ ─ ─ ─ ─ ─ ─ ─ ┐
  MAINTAINING GEOLOCATION OF THE ANY OF THE PLURALITY     ──854
│                     OF USERS                           │
└ ─ ─ ─ ─ ─ ─ ─ ─ ─ ─ ─ ─ ─ ─ ─ ─ ─ ─ ─ ─ ─ ─ ─ ─ ─ ─ ─ ┘
                             │
                             ▼
┌ ─ ─ ─ ─ ─ ─ ─ ─ ─ ─ ─ ─ ─ ─ ─ ─ ─ ─ ─ ─ ─ ─ ─ ─ ─ ─ ─ ┐
  CAUSING THE CONTENT BEING ACTIVELY MODIFIED IN THE      ──855
│ SCAN TO BE PROCESSED BY THE CASB SYSTEM BASED ON       │
                     THE GEOLOCATION
└ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 13

Add SaaS Application Tenant

Last modified at 12:00 PM, Mar 26, 2019 by userbc@samplecompany.com

Choose Cloud App Provider for Authorization

Exchange

Name the Cloud App Tenant

Enter Tenant Name
San Jose-HQ-Exchange ← 1006
The Tenant Name must be unique.

Authorize Cloud App Permission

To enable Data Loss Protection and Malware scanning, you need to provide Zscaler with the Admin's credentials of your organization. ← 1008

Zscaler App (Client) ID
527731bb-bb5c-4bfb-9a65-209b842dddf4

Tenant ID
d6ba17fa-07dd-48cc-8987-a7824e5abe1f

Provide Admin Credentials

Save     Cancel

FIG. 20

Add SaaS Application Tenant

Lasr modified at 12:00 PM, Mar 26, 2019 by userbc@samplecompany.com

Choose SaaS App Provider for Authorization

Dropbox

Name the SaaS App Tenant

Enter Tenant Name
San Jose-HQ-Dropbox — 1006
The Tenant Name must be unique.

Authorize SaaS App Permission

To enable Data Loss Protection and Malware scanning, you need to provide Zscaler with the Admin's credentials of your organization. — 1008

Zscaler App (Client) ID    Tenant ID
Kiewhf294vvhuehaadfvbf    Enioqnf92dnioNJS Provide Admin Credentials    Need help?

Save

Cancel

- Dashboard
- Analytics
- Policy
- Administration
- Activation
- Search

SaaS Security API

Data Loss Prevention | Malware Detection | Scan Configuration

⊕ Add DLP Rule
- For File Sharing Application
- For Email Application

Configure SaaS Security API Policy

Rules are evaluated in the order specified. Rule evaluation stops at the first match. Cloud app control policies take priority over URL policy which is not visible is to allow all.

☐ File Sharing Application   ☑ Email Application

| Rule Order | Rule Name | Application | Severity | Criteria | Action | Description | Status ⌄ |
|---|---|---|---|---|---|---|---|
| 1 | Internal Data | Exchange | ○ Medium | CLOUD APP TENANT Engineering-Exchange RECEPIENT External DLP ENGINE Internal Only Data Tag | Report incident Only | Restrict internal data from being shared externally. | Enabled ✏ 🗎 ✕ |

Dashboard · Analytics · Policy · Administration · Activation · Search

FIG. 24

SaaS Security API

Dashboard

Data Loss Prevention    Malware Detection    Scan Configuration

⊕ Add Malware Detection Rule

Configure SaaS Security API Policy
Rules are evaluated in the order specified. Rule evaluation stops at the first match. Cloud app control policies take priority over URL policy which is not visible is to allow all.

☐ File Sharing Application   ☑ Email Application

All Tenants ⌄   ⓘ Recommended Policy

| Tenant | Application | Malware Protection | Quarantine Location | Inspection Status ⌄ | |
|---|---|---|---|---|---|
| Engineering-Exchange | Exchange | Report incidents Only | user0001@samplecompany.com | ⊙ Enabled | ✎ ✕ |

Analytics

Policy

Administration

Activation

Search

FIG. 25

| Add DLP Rule for Email Application | ✕ |
|---|---|

DLP RULE

| Rule Order | Admin Rank |
|---|---|
| 1 ⌄ | 1 ⌄ |
| Rule Name | Rule Status |
| Enter Rule Name | Enabled ⌄ |

CRITERIA

| Cloud App Tenant | Component |
|---|---|
| Engineering-Exchange ⌄ | Email Body, Attachments, Subject |
| Sender | Receipient |
| Any ⌄ | External |
| Sender Group | Sender Department |
| Any ⌄ | Any ⌄ |
| DLP Engine | |
| Internal Only Data Tag ⌄ | |

ACTION

| Action | Severity |
|---|---|
| Report Incident | Select Severity ⌄ |

| High |
|---|
| Medium |
| Low |
| Info |

DESCRIPTION

FIG. 26

| Add DLP Rule for Email Application | ✕ |

GENERAL INFO

Application
Exchange ⌄

Tenant
Engineering-Exchange ⌄

Inspection Status
Enabled

Scan Inbound Email Link
Enabled ⌄

ACTION

Action
Report Incident Only

[ Save ]  Cancel

FIG. 27

Risk Cloud Applications in Use

| Application | Category | Threat Index | Upload | Download | Recommended Configuration |
|---|---|---|---|---|---|
| FileDropper | File Sharing | 2 | 100MB | 200MB | Caution |
| Tumblr | Social Networking & Blogging | 8 | 200MB | 300MB | Block |
| Coupons | Consumer | 15 | 300MB | 100MB | Block |
| Groupon | Consumer | 3 | 100MB | 200MB | Caution |
| PDF Converter | File Sharing | 2 | 200MB | 300MB | Block |
| Printerest | Social Networking & Blogging | 8 | 300MB | 100MB | Block |
| Coupons | Consumer | 15 | 100MB | 200MB | Caution |
| FileDropper | File Sharing | 3 | 200MB | 300MB | Block |
| Coupons | Consumer | 8 | 300MB | 300MB | Caution |
| Tumblr | Social Networking & Blogging | 15 | 300MB | 200MB | Caution |

FIG. 29B

SaaS Security Insights Log

Feb 1 - Mar 2, 2019
574 log Records Found

1130

| Event Time | Police Type | Application | Rule Name | Action |
|---|---|---|---|---|
| Friday, March 01, 2019 2:30:45 AM | DLP | Exchange | Intelectual Property | Report Incident |
| Friday, March 01, 2019 1:30:45 AM | DLP | Exchange | PII | Report Incident |
| Thursday, February 28, 2019 1:30:45 AM | Malware | Exchange | - | Report Incident |
| Wednesday, February 27, 2019 1:30:45 AM | Malware | Exchange | - | Report Incident |
| Wednesday, February 27, 2019 0:30:45 AM | DLP | Exchange | PII | Report Incident |
| Tuesday, February 26, 2019 11:50:30 PM | DLP | Exchange | Intelectual Property | Report Incident |
| Tuesday, February 26, 2019 11:50:20 PM | Malware | Exchange | - | Report Incident |
| Tuesday, February 26, 2019 3:50:20 PM | DLP | Exchange | Intelectual Property | Report Incident |
| Tuesday, February 26, 2019 1:50:20 PM | DLP | Exchange | PCI | Report Incident |
| Tuesday, February 26, 2019 11:50:20 AM | Malware | Exchange | - | Report Incident |
| Tuesday, February 26, 2019 11:50:20 AM | DLP | Exchange | PCI | Report Incident |
| Monday, February 25, 2019 11:50:20 AM | DLP | Exchange | PII | Report Incident |
| Monday, February 25, 2019 11:50:20 AM | Malware | Exchange | - | Report Incident |
| Monday, February 25, 2019 10:50:20 AM | DLP | Exchange | Intelectual Property | Report Incident |
| Monday, February 25, 2019 8:50:20 AM | DLP | Exchange | PII | Report Incident |
| Monday, February 25, 2019 7:50:20 AM | DLP | Exchange | PCI | Report Incident |

Export to CSV

Tenant

Search Column Names...
- Incident Identifier
- Application name
- Tenant
- Policy Type
- Rule Name
- Department
- Group
- Sender
- Recipient
- External Recipients
- Has attachments
- Number of attachments
- Attachment Types
- Attachment Names
- Message ID
- Thread ID
- MD5s
- Scan ID
- Severity
- Incident log time
- DLP Engine
- DLP Dictionaries
- Threat Class
- Threat Category
- Threat Name Select All    Deselect All Dashboard
Analytics
Policy
Administration
Activation
Search

FIG. 32

← Assets with Incidents

| Application | Tenant | Scan | For |
|---|---|---|---|
| Exchange ∨ | EMEA-Exchange ∨ | Current Scan ∨ | Current Day: 3/2/2020 4:00:00 PM - 3/3/2020 4:28:16 PM ∨ |

Email Messages  Senders  Recipients  ▽ Show Advanced Filters

| Email Messages with Incidents | Email Messages with DLP Incidents | Email Messages with Malware | Externally Sent Email Messages with DLP Malware |
|---|---|---|---|
| 150 | 100 | 80 | 5 |

| Message ID | Thread ID | Attachments | Mail Sent Time | Last Scan Time | Sender | Internal Recipients | External Recipients | |
|---|---|---|---|---|---|---|---|---|
| 82173120893s | 21731208933s | 5 Attachments ∨ | 09:13AM, Jan 27 | 09:13AM, Jan 27 | npearce@acm... | 5 Recipients ∨ | 5 Recipients ∨ | See Scan History |
| 13284ii o2424 | 3284ii o2424 | 8 Attachments ∨ | 05:23AM, Jan 27 | 05:23PM, Jan 28 | svelazque@a... | 10 Recipients ∨ | 10 Recipients ∨ | See Scan History |
| 82173120898s | 21731208988s | 2 Attachments ∨ | 05:28AM, Jan 27 | 05:28AM, Jan 28 | areynolds@ac... | 2 Recipients ∨ | 2 Recipients ∨ | See Scan History |
| 13284ii o2424 | 13284ii o2424 | 5 Attachments ∨ | 06:54PM, Jan 27 | 06:54PM, Jan 28 | npearce@acm... | 2 Recipients ∨ | 2 Recipients ∨ | See Scan History |
| 82173120898s | 82173120898s | 8 Attachments ∨ | 11:33AM, Jan 27 | 11:33AM, Jan 28 | svelazquez@a... | 12 Recipients ∨ | 12 Recipients ∨ | See Scan History |
| 13284ii o2424 | 13284ii o2424 | 2 Attachments ∨ | 03:59AM, Jan 27 | 03:59AM, Jan 28 | areynolds@ac... | 10 Recipients ∨ | 10 Recipients ∨ | See Scan History |
| 82173120898s | 82173120898s | 5 Attachments ∨ | 12:52AM, Jan 27 | 12:52AM, Jan 28 | svelazquez@a... | 9 Recipients ∨ | 9 Recipients ∨ | See Scan History |
| 13284ii o2424 | 13284ii o2424 | 8 Attachments ∨ | 11:18PM, Jan 27 | 11:18PM, Jan 28 | areynolds@ac... | 1 Recipients ∨ | 1 Recipients ∨ | See Scan History |

| SaaS Security API Summary Report | | | |
|---|---|---|---|
| SharePoint | | | |
| Files with incidents | Files with DLP Vilation | Files with Malware | Externally Shared Files with DLP Violation |
| 279 | 190 | 120 | 10 |
| > Files per Tenant | | | |
| Box | | | |
| Files with incidents | Files with DLP Vilation | Files with Malware | Externally Shared Files with DLP Violation |
| 279 | 190 | 120 | 10 |
| > Files per Tenant | | | |
| Google Drive | | | |
| Files with incidents | Files with DLP Vilation | Files with Malware | Externally Shared Files with DLP Violation |
| 279 | 190 | 120 | 10 |
| > Files per Tenant | | | |
| Dropbox | | | |
| Files with incidents | Files with DLP Vilation | Files with Malware | Externally Shared Files with DLP Violation |
| 279 | 190 | 120 | 10 |
| > Files per Tenant | | | |

FIG. 35B

← Assets with Incidents

| Application | Tenanat | Scan | For | | |
|---|---|---|---|---|---|
| OneDrive ∨ | HQ-OneDrive ∨ | Current Scan ∨ | Current Day: 3/2/2020 4:00:00 PM - 3/3/2020 4:28:16 PM ∨ | Reset | Apply |

Files  Owners  Collaborators  ▽ Show Advanced Filters

| Files with Incidents | Files with DLP Violation | Files with Malware | Files with Externally Collaborators | Publicly Shared Files with DLP Violation |
|---|---|---|---|---|
| 150 | 100 | 80 | 5 | 12 |

| File ID | File Name | File Path | Last Scan Time ⊙ | Severity of Last incident | Owner | External Collaborators | |
|---|---|---|---|---|---|---|---|
| 82173120893s | system1.docx | /OneDrive/b... | 03:59AM, Jan 28 | High | npearce@acm... | 5 Collaborators ∨ | See Scan History |
| 13284i1o2424 | system2.pdf | /OneDrive/b... | 05:23AM, Jan 28 | Medium | svelazquez@a... | 10 Collaborators ∨ | See Scan History |
| 82173120893s | system3.docx | /OneDrive/b... | 05:28AM, Jan 28 | High | areynolds@ac... | - | See Scan History |
| 13284i1o2424 | system4.pdf | /OneDrive/b... | 09:13AM, Jan 28 | Medium | npearce@acm... | 2 Collaborators ∨ | See Scan History |
| 82173120893s | system5.docx | /OneDrive/b... | 11:33AM, Jan 28 | High | svelazquez@a... | 12 Collaborators ∨ | See Scan History |
| 13284i1o2424 | system6.pdf | /OneDrive/b... | 12:52PM, Jan 28 | Medium | areynolds@ac... | - | See Scan History |
| 82173120893s | system7.docx | /OneDrive/b... | 06:54PM, Jan 28 | High | svelazquez@a... | 9 Collaborators ∨ | See Scan History |
| 13284i1o2424 | system8.jpg | /OneDrive/b... | 11:18PM, Jan 28 | Medium | areynolds@ac... | 1 Collaborators ∨ | See Scan History |

FIG. 36

← Assets with Incidents

| Application | Tenanat | Scan | For |
|---|---|---|---|
| OneDrive ⌄ | HQ-OneDrive ⌄ | Current Scan ⌄ | Current Day: 3/2/2020 4:00:00 PM - 3/3/2020 4:28:16 PM ⌄ |

▽ Show Advanced Filters          Reset  [Apply]

Files  Owners  Collaborators

| Owners of Files with Incidents | Owners of Files with DLP Violation | Owners of Files with Malware | Owners of Files with External Collaborators | Owners of Publicly Shared Files |
|---|---|---|---|---|
| 75 | 45 | 32 | 12 | 23 |

| Owner ID | Number of Files with Incidents ⊙ | Number of External Collaborators ⊙ | Number of Internal Collaborators ⊙ |
|---|---|---|---|
| braulio_huel@acmecorp.com | 8 | 8 | 8 |
| mayert.vinnie@acmecorp.com | 14 | 14 | 14 |
| stewart.cronin@acmecorp.com | 16 | 16 | 16 |
| braulio_huel@acmecorp.com | 15 | 15 | 15 |
| mayert.vinnie@acmecorp.com | 14 | 14 | 14 |
| stewart.cronin@acmecorp.com | 16 | 16 | 16 |
| mayert.vinnie@acmecorp.com | 14 | 14 | 14 |
| stewart.cronin@acmecorp.com | 16 | 16 | 16 |

FIG. 37

Files with Incidents: Owner braulio_Huel@acmecorp.com on Tenant HQ-OneDrive

Scan Current Scan

For Current Day: 3/2/2020 4:00:00 PM - 3/3/2020 4:28:16 PM

| File ID | File Name | File Path | Last Scan Time | Last Modified | Severity of Last Incident | External Collaborators | Collaboration Scope | File Size |
|---|---|---|---|---|---|---|---|---|
| 82173120893s | system1.docx | /OneDrive/b... | 03:59AM, Jan 28 | 07:43PM, Jan 28 | High | 5 Collaborators | External | 10 MB |
| 13284i102424 | system2.pdf | /OneDrive/b... | 05:23PM, Jan 28 | 04:32AM, Jan 28 | Medium | 10 Collaborators | External | 21 MB |
| 82173120893s | system3.docx | /OneDrive/b... | 05:28AM, Jan 28 | 11:17PM, Jan 28 | High | - | Internal | 5 MB |
| 13284i102424 | system4.pdf | /OneDrive/b... | 09:13AM, Jan 28 | 00:23AM, Jan 28 | Medium | 2 Collaborators | External | 10 MB |
| 82173120893s | system5.docx | /OneDrive/b... | 11:33AM, Jan 28 | 02:27AM, Jan 28 | High | 12 Collaborators | External | 21 MB |
| 13284i102424 | system6.pdf | /OneDrive/b... | 12:52PM, Jan 28 | 04:42AM, Jan 28 | Medium | - | Internal | 5 MB |
| 82173120893s | system7.docx | /OneDrive/b... | 06:54AM, Jan 28 | 11:07PM, Jan 28 | High | 9 Collaborators | External | 10 MB |
| 13284i102424 | system8.jpg | /OneDrive/b... | 11:18PM, Jan 28 | 03:34AM, Jan 28 | Medium | 1 Collaborators | External | 21 MB |

FIG. 38

← Assets with Incidents

| Application | Tenant | Scan | For |
|---|---|---|---|
| OneDrive ∨ | HQ-OneDrive ∨ | Current Scan ∨ | Current Day: 3/2/2020 4:00:00 PM - 3/3/2020 4:28:16 PM ∨ |

Files  Owners  Collaborators

▽ Show Advanced Filters

External Collaborators
of Files with Incidents
46

| External Collaborator ID | Number of Files with Incidents | Owners |
|---|---|---|
| art_senna@gmail.com | 8 | 5 Owners ∨ |
| adella.flatley@drake.name | 14 | 10 Owners ∨ |
| erich_walsh@coy.me | 16 | 10 Owners ∨ |
| kennith_lebsack@yahoo.com | 15 | 2 Owners ∨ |
| hagenes_chirst@hessel.co.uk | 14 | 12 Owners ∨ |
| art_senna@gmail.com | 16 | 5 Owners ∨ |
| adella.flatley@drake.name | 14 | 9 Owners ∨ |
| erich_walsh@coy.me | 16 | 1 Owners ∨ |

FIG. 39

CLOUD ACCESS SECURITY BROKER USER INTERFACE SYSTEMS AND METHODS

FIELD OF THE DISCLOSURE

The present disclosure relates generally to networking and computing. More particularly, the present disclosure relates to Cloud Access Security Broker (CASB) User Interface (UI) systems and methods.

BACKGROUND OF THE DISCLOSURE

Traditionally, before the cloud, corporate or enterprise resources were fully under the control of Information Technology (IT) administration ("admins"). That is, sensitive enterprise data was located within a network under IT admin control with perimeter defenses. Here, IT admins have full control of access privileges, activity, etc. As is well-known, enterprises are moving their IT infrastructure to the cloud for a variety of cloud services (Software-as-a-Service (SaaS)) for email (e.g., Office 365, Gmail, etc.), file storage (OneDrive, Dropbox, Box, Google Drive, SharePoint, etc.), document preparation and content collaboration (e.g., Office 365, Google Docs, etc.), Customer Relationship Management (CRM) (e.g., Salesforce, etc.), and the like. Here, enterprise IT admins no longer have the same level of control of enterprise resources, i.e., content is stored in the cloud, and IT simply does not have the same level of control as before.

A Cloud Access Security Broker (CASB) is an on-premises system or cloud-based service between cloud service users and cloud applications. The CASB is configured to monitor activity and enforce security policies, such as monitoring user activity, warning administrators about potentially hazardous actions, Data Loss Prevention (DLP), enforcing security policy compliance, automatically preventing malware, etc. For example, a CASB system, either on-premises or as a cloud-based service, can scan through a large number of files in a cloud or SaaS application, e.g., Office 365, Dropbox, Box, Google Drive, Salesforce, etc. This places tremendous loads on traditional CASB systems, resulting in latency, inability to properly scan all files, poor user experience, etc. In effect, an objective of a CASB system or scanner is to provide IT admin with control as if the enterprise resources were fully under the IT admin's control as before the cloud.

Again, the goal of IT is to have similar control of cloud-based deployments as was with conventional deployments. Towards this goal, there is a need to support visualizations, reporting, a User Interface (UI), etc. to support investigation and remediation. With the existing solutions, CASBs are able to provide visibility into cloud usage throughout the organization, control access to cloud services, and threat prevention. However, with the incident-based reports, there lacks a concrete view of the top objects that threaten the organization's security.

BRIEF SUMMARY OF THE DISCLOSURE

The present disclosure relates to Cloud Access Security Broker (CASB) User Interface (UI) systems and methods. The CASB UI systems and methods include consolidated organization level insights into organization's sensitive data exposed accidentally or intentionally outside of the acceptable business sharing policies. The three primary entities analyzed in this report are—unique data objects, unique users internal to the organization and unique external entities. The report presented herein provide insights into potential compliance and user behavioral issues at a click of the button. Efficiently, practitioners can find out if their organization's data is externally exposed (Files Views) or if external malicious entities have access to it (Collaborators Views). The easy to consume summary tiles highlight the severity of the problem at hand and practitioners can investigate further details using the incident reporting drill-down mechanism. It exposes potential data sharing compliance issues in an easily actionable manner. It also highlights potential user behavior issues (Owners Views) where employees repeatedly share data outside of formal business sharing policies. It helps organizations to identify gaps in user education and provide targeted mitigation plans. The history of such repeated behavior also helps organizations in identifying potential malicious insiders. In addition to the incidents generated from cloud applications in use, the report shows which unique objects, internal/external users are associated with DLP violations or malware, so that they can investigate and take actions accordingly.

In various embodiments, the present disclosure includes a method with steps, a system including a cloud node, a Cloud Access Security Broker (CASB) system, and/or a cloud-based system configured to implement the steps, and a non-transitory computer-readable storage medium having computer-readable code stored thereon for programming one or more processors to perform the steps. The steps include, responsive to a scan by the CASB system of a plurality of users associated with a tenant in a Software-as-a-Service (SaaS) application where the scan includes identifying malware in content in the SaaS application and performing Data Loss Prevention (DLP) in the content in the SaaS application, maintaining records associated with a plurality of incidents for the malware and the DLP; providing a User Interface (UI) for the tenant including an analytics view with a plurality of summary tiles including visualizations of the plurality of incidents for the malware and the DLP for the tenant; and providing the UI for the tenant including a table listing any of the plurality of incidents for the malware and the DLP for the tenant, including any of unique data objects, unique users internal to the tenant, and unique external entities, associated with the plurality of incidents.

The steps can further include providing the UI for the tenant to onboard a plurality of SaaS applications including the SaaS application. The steps can further include providing the UI for the tenant to configure policies for the DLP and for the malware for the SaaS application. The steps can further include, responsive to a selection of any entry in the table, providing a popup listing details associated with the corresponding incident. The SaaS application can be one of a plurality of SaaS applications for the tenant, and wherein the visualizations can include a table listing the plurality of incidents associated with the plurality of SaaS applications. The visualizations can include one or more pie charts illustrating the plurality of incidents. The visualizations can include a line chart illustrating the plurality of incidents over time.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a server which may be used in the cloud-based system of FIG. 1, to implement a CASB system or the like;

FIG. 3 is a block diagram of a mobile device which may be used in the cloud-based system of FIG. 1 or the like;

FIG. 13 is a flowchart of a historical and live scanning process for CASB functionality;

FIGS. 18-23 are screenshots of an onboarding process for enrolling an organization through the CASB system with a SaaS application;

FIGS. 24-27 are screenshots of a policy configuration process, subsequent to the onboarding process;

FIGS. 28-35 are screenshots of various reports and visualizations associated with monitoring through the CASB system;

FIG. 36 is a screenshot of an assets with incidents view illustrating a file tab;

FIG. 37 is a screenshot of the assets with incidents view illustrating an owners tab;

FIG. 38 is a screenshot of a popup view illustrating files with incidents for a specific owner;

FIG. 39 is a screenshot of the assets with incidents view illustrating a collaborators tab.

DETAILED DESCRIPTION OF THE DISCLOSURE

Again, the present disclosure relates to Cloud Access Security Broker (CASB) User Interface (UI) systems and methods. The CASB UI systems and methods include consolidated organization level insights into organization's sensitive data exposed accidentally or intentionally outside of the acceptable business sharing policies. The three primary entities analyzed in this report are—unique data objects, unique users internal to the organization and unique external entities. The report presented herein provide insights into potential compliance and user behavioral issues at a click of the button. Efficiently, practitioners can find out if their organization's data is externally exposed (Files Views and Email Messages Views) or if external malicious entities have access to it (Collaborators Views). For example, the organization's data can be objects which may include a file, such as in the case of a file sharing SaaS, an email message in the case of email SaaS applications (e.g., FIG. 33 are email message based object views), etc. The easy to consume summary tiles highlight the severity of the problem at hand and practitioners can investigate further details using the incident reporting drill-down mechanism. It exposes potential data sharing compliance issues in an easily actionable manner. It also highlights potential user behavior issues (Owners Views) where employees repeatedly share data outside of formal business sharing policies. It helps organizations to identify gaps in user education and provide targeted mitigation plans. The history of such repeated behavior also helps organizations in identifying potential malicious insiders. In addition to the incidents generated from cloud applications in use, the report shows which unique objects, internal/external users are associated with DLP violations or malware, so that they can investigate and take actions accordingly.

Example Cloud-Based System Architecture

Figure 1A:
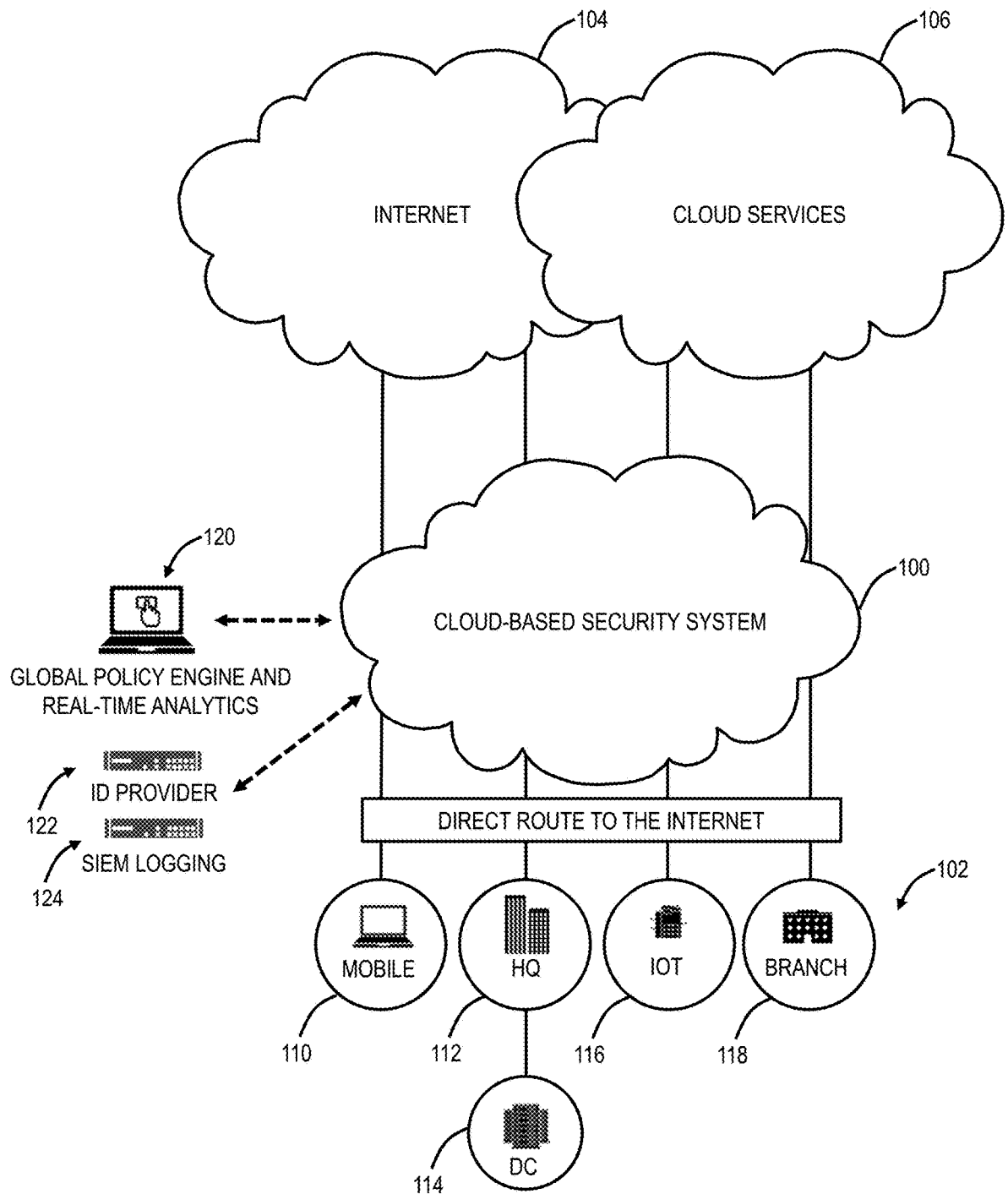
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not. A description of DLP functionality is provided in commonly-assigned U.S. patent application Ser. No. 16/923,225, filed Jul. 8, 2020, and entitled "Data Loss Prevention via Indexed Document Management," the contents of which are incorporated by reference herein in their entirety.

Figure 3:
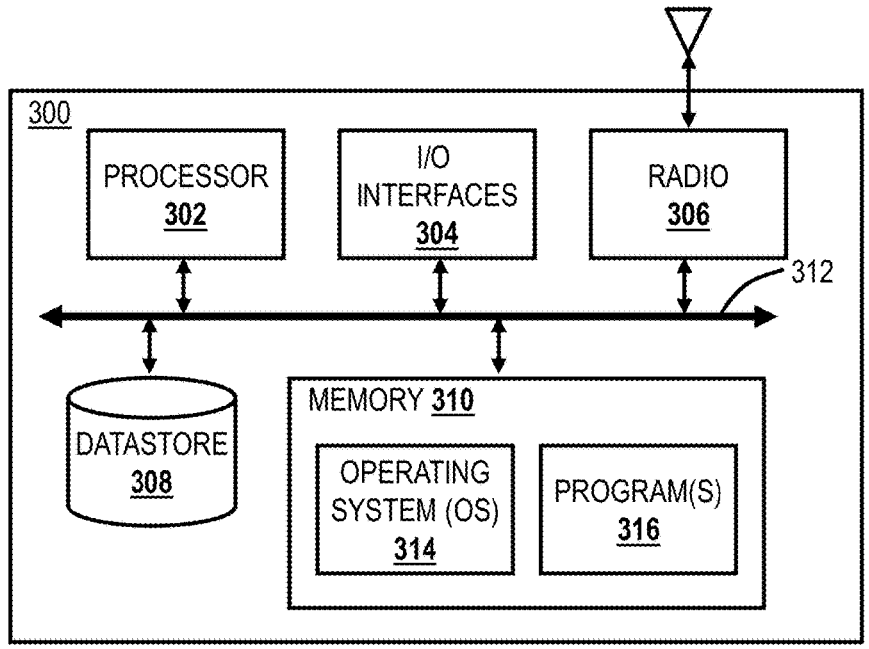

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant or company is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 106) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116 can use a local application that forwards traffic, a proxy such as via a Proxy Auto-Config (PAC) file, and the like. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 1B:
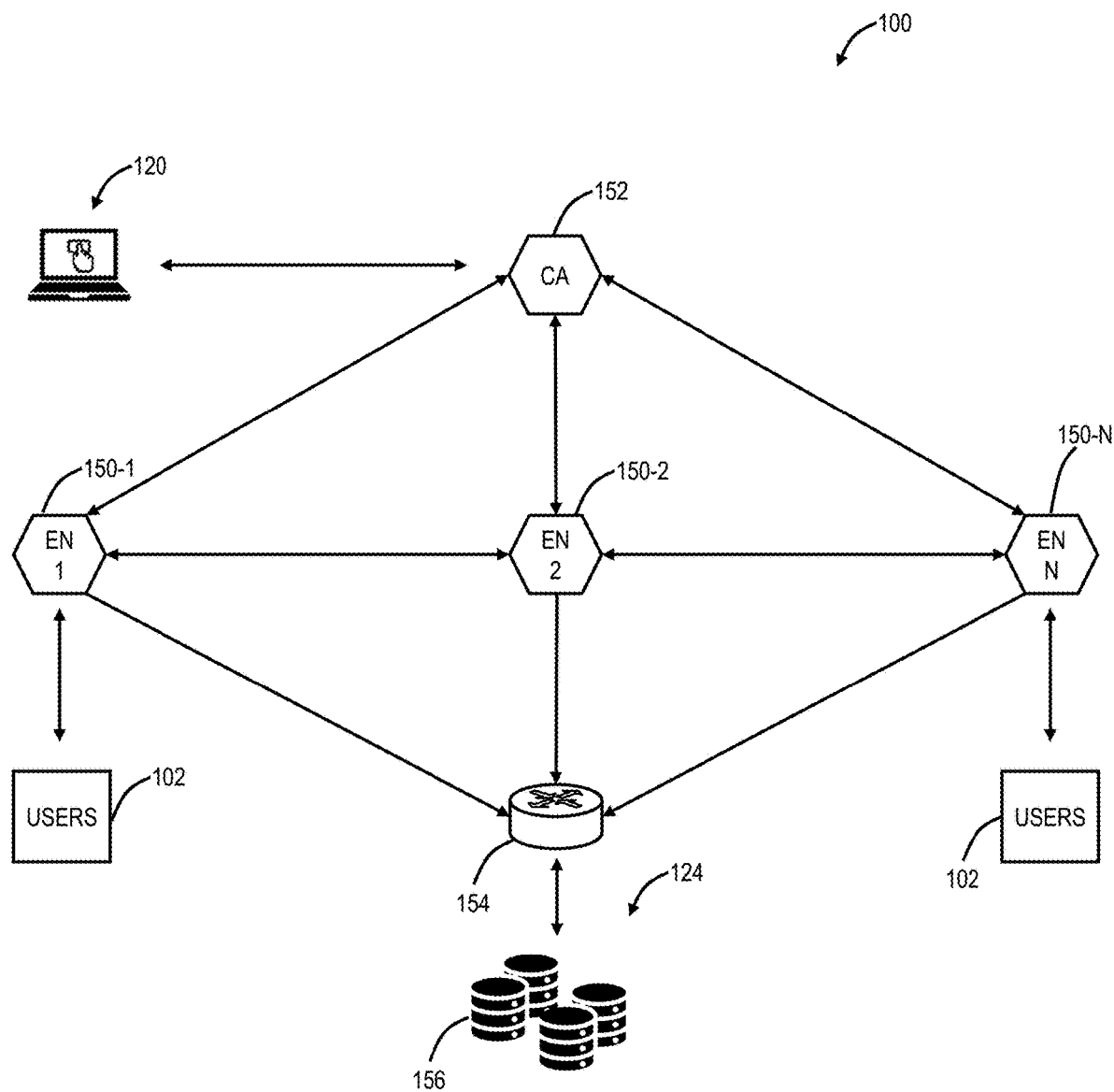
FIG. 1B is a network diagram of an example implementation of the cloud-based system of FIG. 1.

FIG. 1B is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers, including physical servers, virtual machines (VM) executed on physical hardware, etc. That is, a single node 150, 152 can be a cluster of devices. An example of a server is illustrated in FIG. 1B. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

The enforcement nodes 150 are full-featured secure internet gateways that provide integrated internet security. They inspect all web traffic bi-directionally for malware and enforce security, compliance, and firewall policies, as described herein. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization.

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

Once downloaded, a tenant's policy is cached until a policy change is made in the management system 120. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Other cloud services can include Office 365, Dropbox, Box, Google Drive, Salesforce, and the like. In the context of these services, a provider of such cloud services can be referred to as a cloud provider, a SaaS provider, etc., and may utilize a hardware architecture similar to the cloud-based system 100. Of course, other types of cloud architectures are also contemplated.

Example Server Architecture

Figure 2:
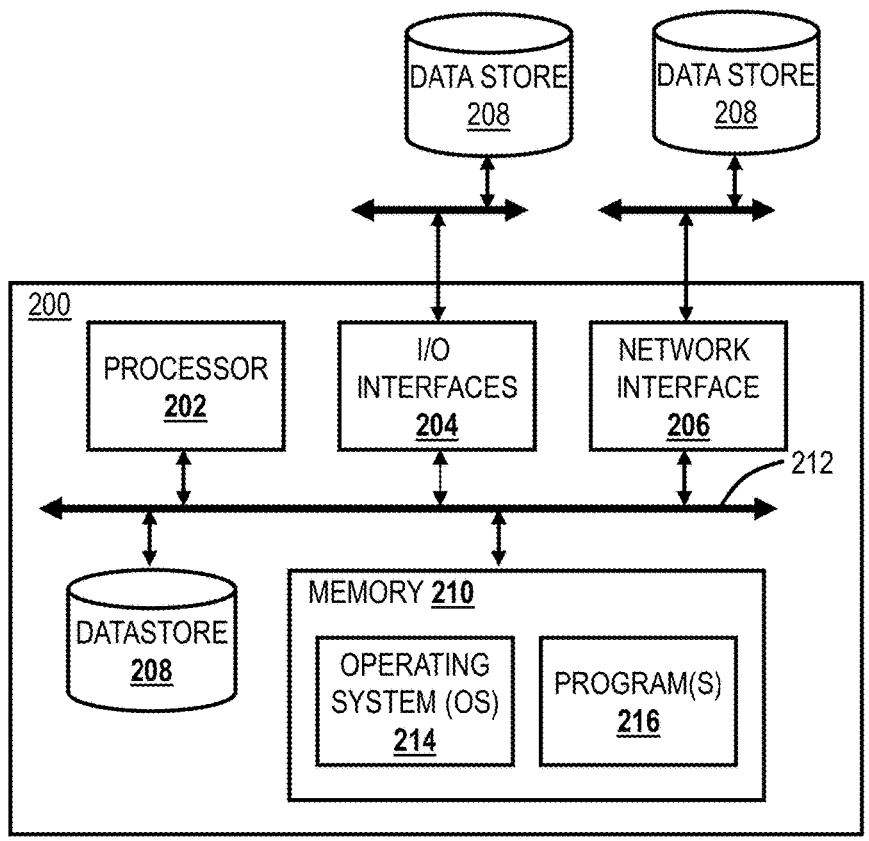

FIG. 2 is a block diagram of a server 200, which may be used in the cloud-based system 100, in a CASB system, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Example User Device Architecture

FIG. 3 is a block diagram of a user device 300, which may be used in the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a radio 306, a data store 308, and memory 310. It should be appreciated by those of ordinary skill in the art that FIG. 3 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

CASB System

Figure 4:
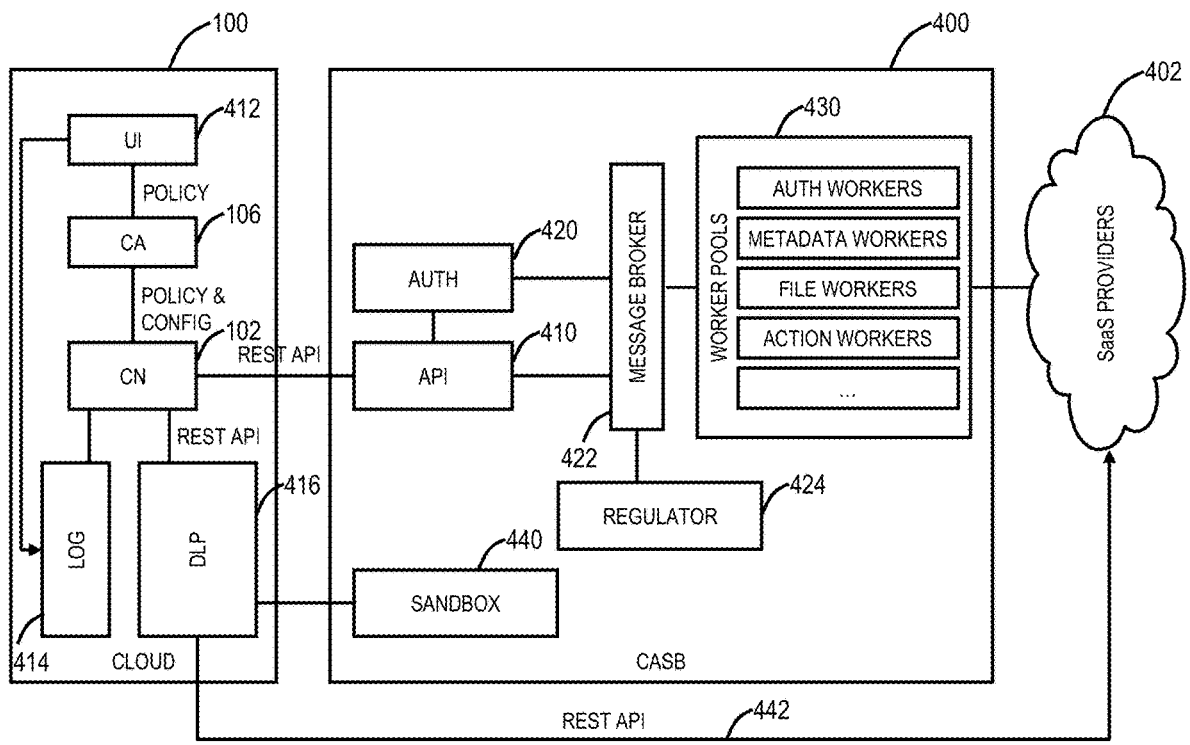
FIG. 4 is a network diagram of a CASB system.

FIG. 4 is a network diagram of a CASB system 400. The CASB system 400 can be located between the cloud-based system 100 and one or more SaaS providers 402. As described herein, the SaaS providers 402 can be referred to as cloud providers, cloud service providers, service providers, etc. Examples of the providers 402 include, without limitation, Office 365, Dropbox, Box, Google Drive, Salesforce, etc. That is the providers 402 can provide cloud services for enterprises related to file sharing, document management, email, collaboration, scheduling, timekeeping, financial, etc. The key point is the enterprise IT is moving from local applications hosted and maintained within the enterprise network to cloud-based solutions where the data is located off-site, in the providers 402.

The CASB system 400 can be implemented in a cloud-based system, such as using the architecture of the cloud-based system 100. The CASB system 400 can be implemented in a private cloud, a public cloud, or a hybrid cloud. Alternatively, the CASB system 400 can be one or more servers 200 that can be located on-premises with an enterprise, off-premises, etc. Even further, the CASB system 400 can be collocated with the SaaS providers 402. That is, various architecture implementations are contemplated. Further, the CASB system 400 contemplated both operations with the cloud-based system 100, operating as a distributed security system, as well as independent operation (i.e., with the components of the cloud-based system 100 omitted in FIG. 4, and with the functionality incorporated in the CASB system 400 itself).

The objective of the CASB system 400 is to provide enterprise IT control over data (resources) in the SaaS providers 402. Note, as described herein, the enterprise can be referred to as a tenant of the provider 402. The CASB system 400 is configured to operate as a distributed file crawler for files associated with a particular tenant. The CASB system 400 can both provide a report based on the file crawling as well as implement policy actions based on policy configuration.

The CASB system 400 includes one or more APIs 410, such as a Representational state transfer (REST) API. In an embodiment, the APIs 410 connect to the cloud-based system 100, such as one of the enforcement nodes 150. Here, a user can interact with the CASB system 400 via a User Interface (UI) 412 through the central authority 152. Additionally, the enforcement node 150 can connect to a log 414, such as a data store that stores statistics and transactions, for reporting. The enforcement node 150 can also connect to a DLP engine 416 for data leakage protection through the CASB system 400. Here, the CASB 400 can be used to identify content, files, etc. that match sensitive data in a DLP dictionary. The user can provide policy and configuration via the UI 412.

Again, the CASB system 400 can be deployed without the cloud-based system 100. Here, the API 410 can connect directly to the UI 412, and the log 414 and the DLP engine 416 can be incorporated directly in the CASB system 400, or in an external system.

The CASB system 400 includes an authentication provider 420 that is configured to perform authentication of the tenant with the SaaS providers 402. The APIs 410 and the authentication provider 420 connect to a message broker 422, which is configured to interact between the APIs 410, the authentication provider 420, and a plurality of workers 430. A regulator 424 is connected to the message broker. The message broker 422 is a pipeline where job tickets are queued for consumption by the workers 430.

In an embodiment, the authentication provider 420, a controller for the APIs 410, the regulator 424, and the workers 430 are Java Spring services, and other embodiments are also contemplated. The message broker 422 can be a queuing service, such as using Apache Kafka, Microsoft EventHub, or other embodiments. The API controller is a liaison service that interfaces between the CASB system 400 and the cloud-based system 100.

With respect to the authentication provider 420, customer information, including tokens and credentials are not stored permanently or persisted. Also, the CASB system 400 is not tied specifically to a particular SaaS provider 402. That is, the CASB system 400 is configured to operate with multiple, different SaaS providers 402. This is accomplished through customized APIs and configuration of the workers 430. Each SaaS provider 402 can have a different set of APIs and functionality.

The workers 430 are connected to the SaaS providers 402 and are dedicated to performing particular tasks. In a sense, the plurality of workers 430 are organized in a pool of workers, and tasks are assigned between the workers 430. The CASB 400 can include a sandbox 440 that can be connected to the DLP engine 416, and the DLP engine 416 can also include a REST API 445 connection to the SaaS providers 402. Note, the sandbox 440 can be included in the CASB system 400, or it can be an external system. The sandbox 440 is configured to execute files, open files, etc. in a safe environment to analyze whether the files are malicious or not.

The worker pool is a collection of workers 430 that interact with the SaaS provider 402 and perform specific tasks. The pool of workers 430 enables the CASB system 400 to operate efficiently in a distributed nature. The workers 430 are assigned tasks from various queues, via the message broker 422 and the regulator 424. Thus, the workers 430 can operate akin to an assembly line, and there can be hand-offs between workers 430. For example, the workers 430 can include authentication workers to authenticate users, tenants, etc., metadata workers to analyze file or content metadata, file workers to scan/analyze files, action workers to perform various policy-related actions, and the like.

The workers 430 can logically be viewed as contract workers in a factory, on an assembly line, etc. The workers 430 are provided specific instructions in a job ticket. The job ticket has information on what job to be performed, where to get the inputs, and where to send the outputs. Every worker 430 also knows what to do when something goes wrong.

The regulator 424 is like the SCADA (Supervisory Control and Data Acquisition) in a control system architecture. The regulator 424 monitors the performance of all the workers 430 and controls the overall system for optimum throughput.

Job Ticket Example

Again, the message broker 422 assigns jobs to the workers 430. Here is an example of a job ticket for an example job:

```
{
TenantID : 123456
TransactionID : 111111
JobType : GetTenantUsers
Run ID : 1
SaaSProvider : Google Drive
...
...
...
}
```

Design Constraints

Again, each different SaaS provider 402 can have a different set of APIs and functionality. The CASB system 400 is configured to interface with a plurality of different SaaS providers 402. The log 414 can be configured to store changes/events for an entire organization, including on a per user basis.

The APIs between the CASB 400 and the SaaS providers 402 may be limited, e.g., throttled by the SaaS providers 402. As such, there is an initial baseline crawl (i.e., a first-run) where the CASB system 400 has to crawl and scan all files in the SaaS provider 402. This initial baseline crawl is performed efficiently and is synchronized with the DLP engine 416. After the baseline crawl, subsequent crawls are performed incrementally, namely through files that changed since the previous crawl. For example, the first run can be referred to as run one, and each incremental crawl is run X, which only scans and crawls files that have changed since run X−1. In an embodiment, the period of incremental calls is once a day. Of course, other periods are also contemplated.

File Crawl

The SaaS providers 402 generally provide two ways to crawl through the files for a tenant, namely crawling based on organization-wide file activity or a change log and crawling based on a pseudo-breadth-first traversal. The file activity or a change log enables crawling based on file changes. The pseudo-breadth-first traversal is crawling based on snapshots.

Figure 5:
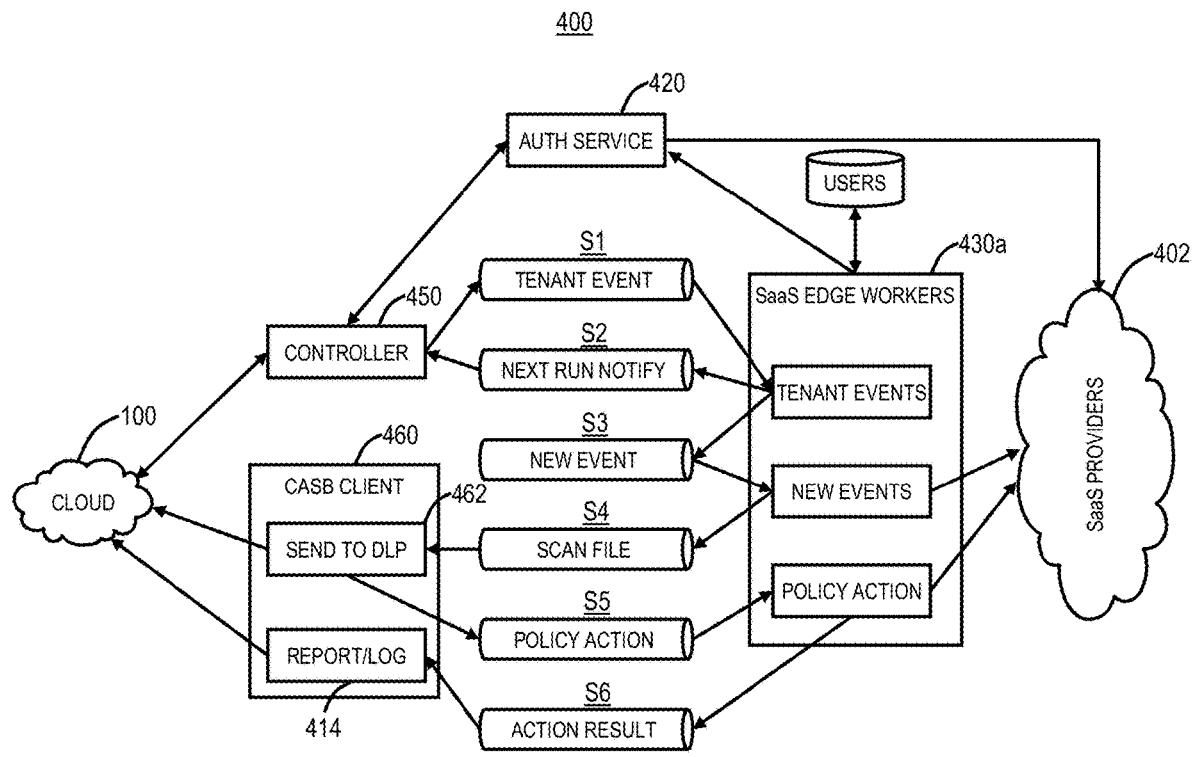
FIG. 5 is a functional block diagram of filing crawling of the SaaS provider with the CASB system.

FIG. 5 is a functional block diagram of filing crawling of the SaaS provider 402 with the CASB system 400. Specifically, FIG. 5 illustrates functionality associated with file crawling in the SaaS provider 402 by the CASB 400. The CASB 400 includes a controller 450, such as the message broker 422 and the regulator 424. The controller 450 can communicate with the cloud-based system 100 and the authentication provider 420. The authentication provider 420 can communicate with the SaaS providers 402. The CASB 400 can also include a CASB client 460 that includes a worker for DLP 462 and the log 414. In the example of FIG. 5, there are edge workers 430a that interface between the authentication provider 420, the SaaS provider 402, the controller 450, and the CASB client 460. The objective of the edge workers 430a is to perform file crawling of the SaaS providers 402. In an embodiment, the SaaS providers 402 can be file storage providers, such as, for example, Office 365 (SharePoint), Box, DropBox, etc.

For illustration, an example operation is described in FIG. 5. There is a tenant event (S1) from the controller 450 to the edge worker 430a. The next run notification (S2) is provided from the edge worker 430a after all files are crawled in the run. The edge worker 430a notes a new event (S3) with file meta-data, the edge worker 430a fetches file details and provides a file for scanning (S4) which is sent to DLP 562 for scanning and analysis. A policy action (S5) can be the result of the DLP 562 and provided to the edge worker 430a. The edge worker 430a can implement the policy action in the SaaS provider 402 and provide the result (S6) for the log 414. For example, a policy action can be to delete a file, quarantine a file, flag a file, etc.

Crawling Based on a Change Log

Figure 6:
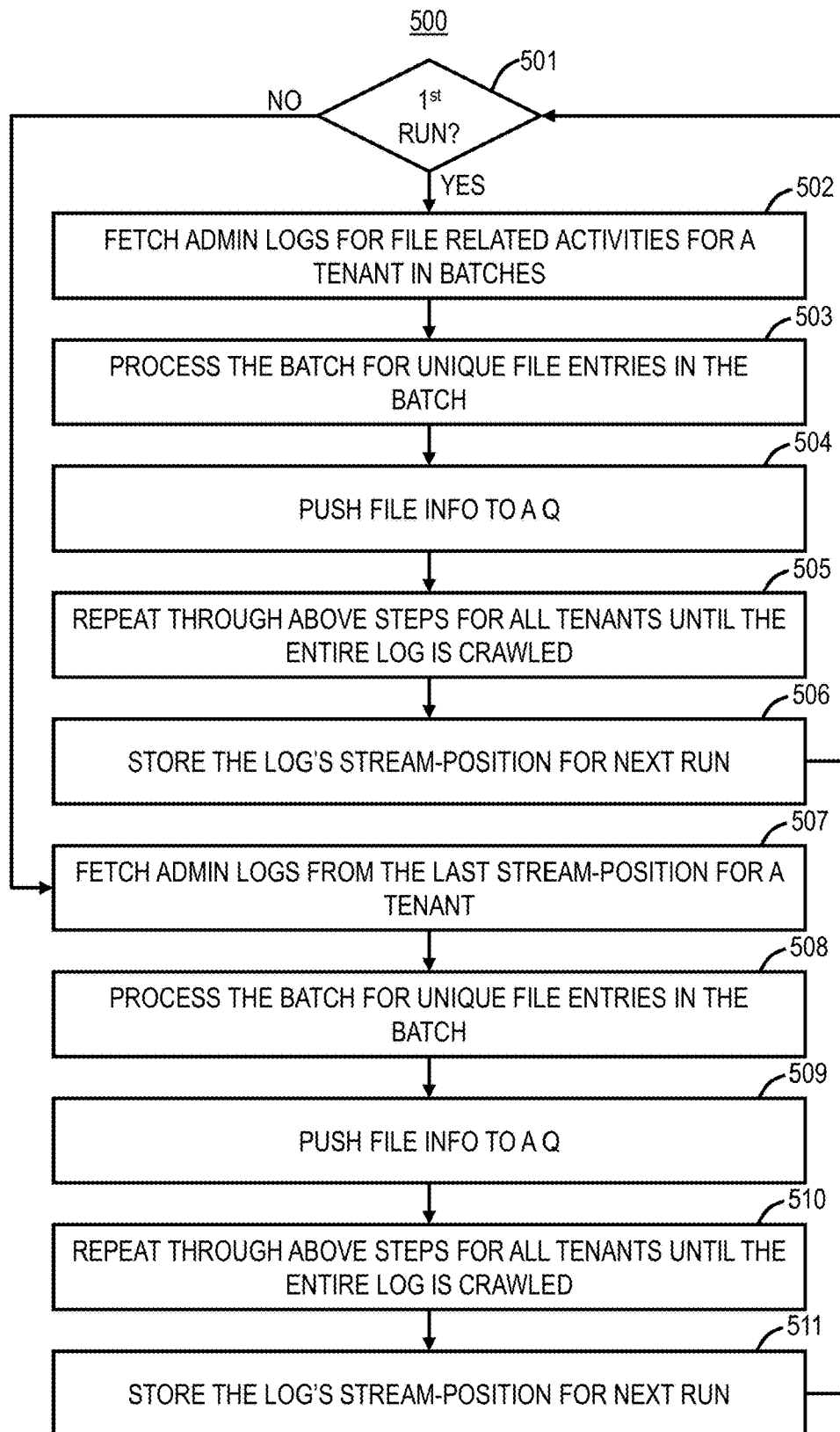
FIG. 6 is a flowchart of a file crawling process based on a change log.

FIG. 6 is a flowchart of a file crawling process 500 based on a change log. The file crawling process 500 contemplates implementation by the CASB system 400 to crawl the SaaS provider 402. The file crawling process 500 includes, for a first run (step 501), fetching admin logs for file-related activities for a tenant in batches (step 502), processing the batch for unique file entries in the batch (step 503), pushing the file info into a queue (Q) (step 504), repeating steps 503, 504 until the entire log is crawled (step 505), and storing the log's stream-position for a next Run (step 506).

For a run X (step 501) where X is an integer greater than 1, the file crawling process 500 includes, fetching admin logs from the last stream-position for a tenant (step 507), processing the batch for unique file entries in the batch (step 508), pushing file info to a queue (Q) (step 509), repeating through above steps 508, 509 for all tenants until the entire log is crawled (step 510), and storing the log's stream-position for a next Run (step 511).

Crawling Based on the Breadth-First Traversal

Figure 7:
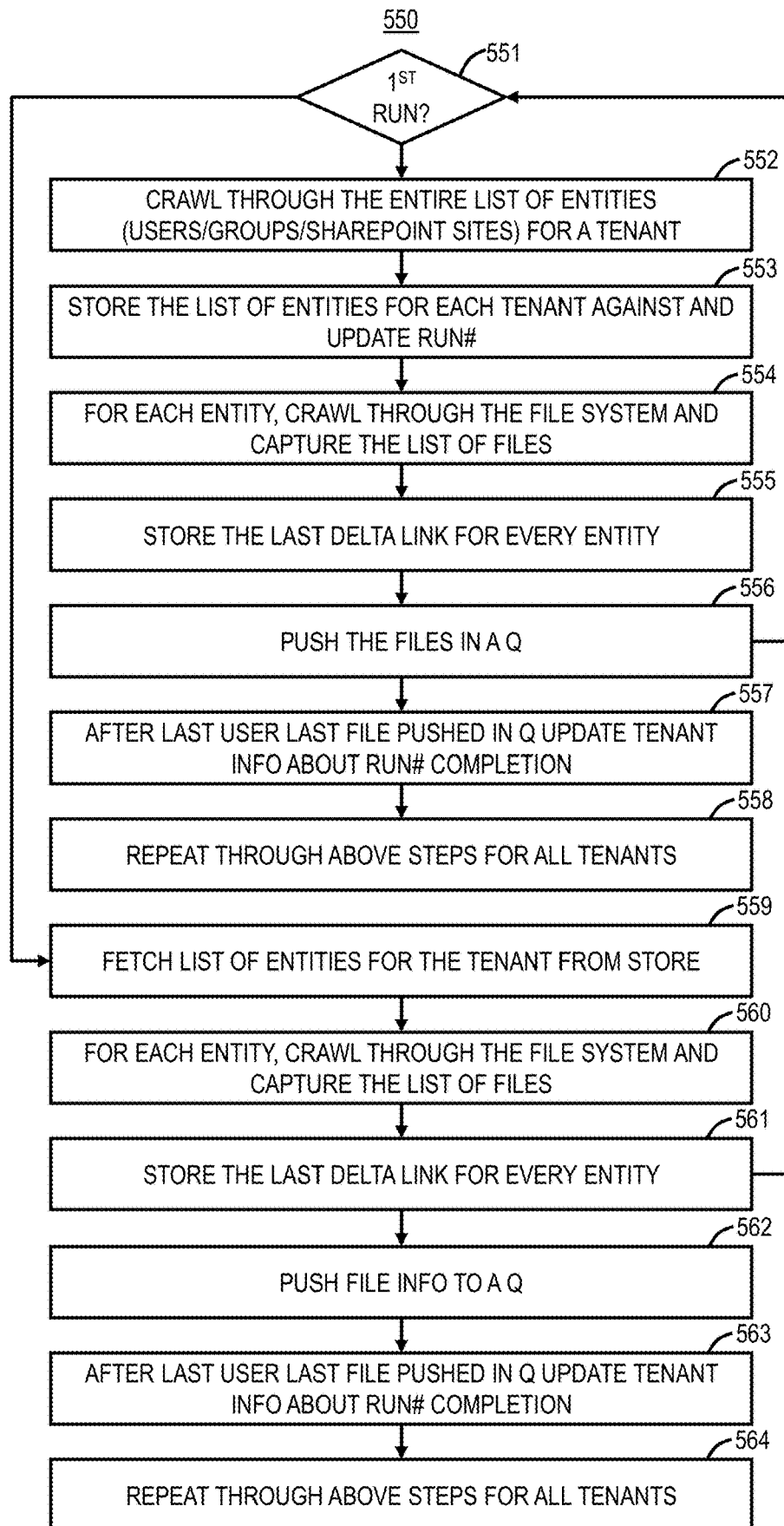
FIG. 7 is a flowchart of a file crawling process based on breadth-first traversal.

FIG. 7 is a flowchart of a file crawling process 550 based on breadth-first traversal. The file crawling process 550 contemplates implementation by the CASB system 400 to crawl the SaaS provider 402. For example, some SaaS providers 402 may not maintain a change log for a tenant, but instead, provide a snapshot of a user's filesystem and then a change log for every user. The file crawling process 500 includes, for a first run (step 551), crawling through the entire list of entities (Users/Groups/SharePoint Sites) for a tenant (step 552), and storing the list of entities for each tenant against and update Run # (step 553). For each entity, the file crawling process 550 includes, crawling through the File System and capturing the list of files (step 554), storing the last delta link for every entity (step 555), and pushing the files in a queue (Q) (step 556). The file crawling process 550 includes, after the last user, the last file pushed in the queue (Q), updating tenant info about Run # completion (step 557), and repeating through the above steps for all tenants (step 558).

For run X (step 551) where X is an integer greater than 1, the file crawling process 550 includes fetching a list of entities for the tenant from a store (step 559), for each entity, crawling through the File System and capture the list of files (step 560), storing the last delta link for every entity (step 561), pushing the files in a queue (Q) (step 562), after the last user last file pushed in the queue (Q), updating tenant info about Run # completion (step 563), and repeating through above steps for all tenants (step 564).

Flow Diagram

Figure 8:
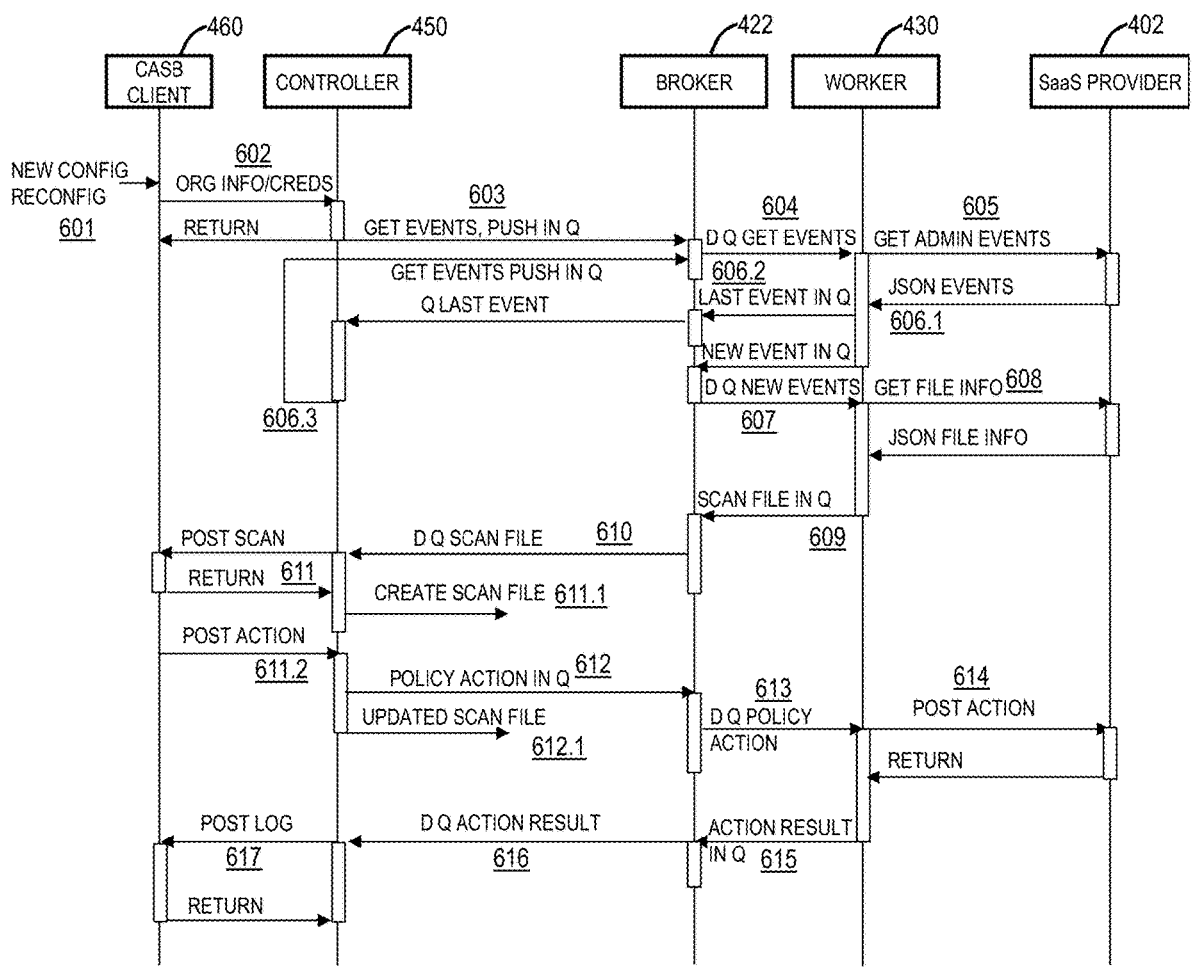
FIG. 8 is a flow diagram of example operations between the CASB client, the controller, the message broker, a worker, and the SaaS provider.

FIG. 8 is a flow diagram of example operations between the CASB client 460, the controller 450, the message broker 422, a worker 430, and the SaaS provider 402. A new configuration or reconfiguration is provided, via the CASB client 460, the cloud-based system 100, etc. (step 601), and organization (tenant) information and credentials are provided to the controller 450 (step 602). The controller 450 gets events and pushes them in a queue (Q). The message broker 422 is configured to dequeue Q) the events and assign it to the worker 430 (step 604). The worker 430 is configured to interact with the SaaS provider 402 to get admin events (step 605), which are provided as JavaScript Object Notation (JSON) events (step 606.1). The process is continued until the queue is emptied, the last event in the queue (step 606.2, 606.3).

The worker 430 can add new events in the queue, and the broker 422 can dequeue the new events when assigning back to a worker 430 (step 607). The worker 430 gets file info (step 608) and receives JSON file info from the SaaS provider 402. The worker 430 can scan each file in the queue (step 609), provide results to the controller 450, which dequeues the scanned file (step 610).

The controller 450 can provide results of the scan to the CASB client 460, which returns information (step 611). The controller 450 can create a scan file (step 611.1) and receive a post-action (step 611.2) from the CASB client 460. For example, the CASB client 460 may perform DLP, and the action can be allow, delete, quarantine, etc. The controller 450 can implement the policy action in the queue (step 612), the brokers 422 can dequeue the policy action (step 613) and assign the action to the worker 430 which posts the action in the SaaS provider (step 614). The worker 430 can provide the action result in a queue (step 615), the broker 422 can dequeue the action results (step 616) and post the action result in the log (step 617).

Webhook Integration

A webhook in web development is a method of augmenting or altering the behavior of an application with custom callbacks. These callbacks may be maintained, modified, and managed by third-party users and developers who may not necessarily be affiliated with the originating website or application. Webhooks are user-defined Hypertext Transfer Protocol (HTTP) callbacks that can be triggered by some event, such as in a SaaS application detecting modification of content. When that event occurs, the SaaS application makes an HTTP request to the URL configured for the webhook. Users can configure them to cause events on one site to invoke behavior on another. SaaS applications from the SaaS providers 402 are configured to support webhooks. Webhooks operation can be compared to APIs. In APIs, one pulls data from a provider. In Webhooks, the SaaS provider 402 pushes data out, e.g., the present disclosure utilizes webhooks for identifying real-time modifications of content in SaaS applications.

The present disclosure is described with reference to the CASB system 400, including all of the various architecture implementations described herein. Again, the CASB system 400 can be provided using the cloud-based system 100, in another cloud (e.g., private cloud, public cloud, hybrid cloud, etc.), as one or more servers 200 (e.g., an appliance located on-premises with an enterprise, off-premises, etc. as well as collocated with the SaaS providers 402). Note, the CASB system 400 as described herein is configured to provide CASB functionality, which may also be referred to as a CASB service. Again, the CASB service functions between the SaaS service users and the SaaS applications from the SaaS providers 402. Among the many services, CASB provides the most critical ones include identify and protect malware and policy enforcement (DLP).

The present disclosure contemplates an organization (i.e., a tenant, a corporation, an enterprise, etc.) having multiple SaaS applications and multiple users spread across multiple countries, states, cities, etc. (generally geography) providing protection as soon as possible with the CASB system 400. That is, the CASB system 400 is configured to scan data, prevent data loss, etc. at near real-time for critical protection. To that end, the CASB system 400 is configured to detect changes in data as soon as a user 102 is active and modifies the data. Further, the CASB system 400 is configured to scan data closest to the source, using geolocation, and scanning in compliance with local law and regulations.

CASB System with Webhooks Integration

Figure 10:
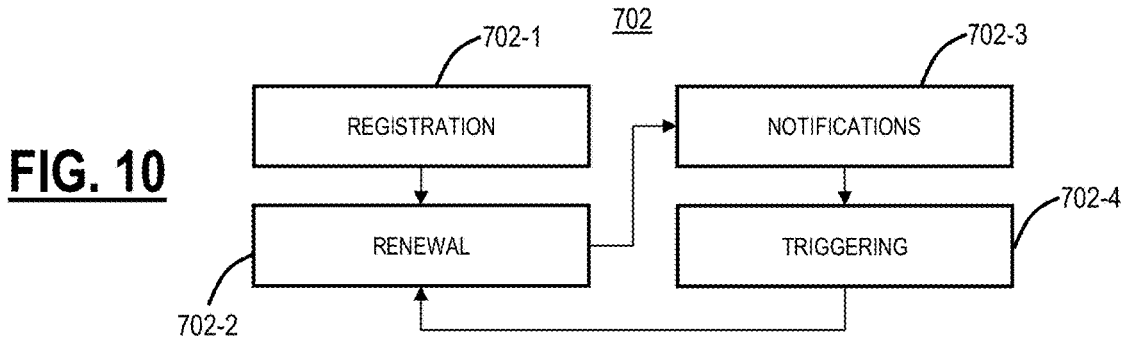
FIG. 10 is a flowchart of a CASB-webhooks integration process, that may be implemented through the CASB-webhooks system of FIG. 10, or in other approaches.
Figure 9:
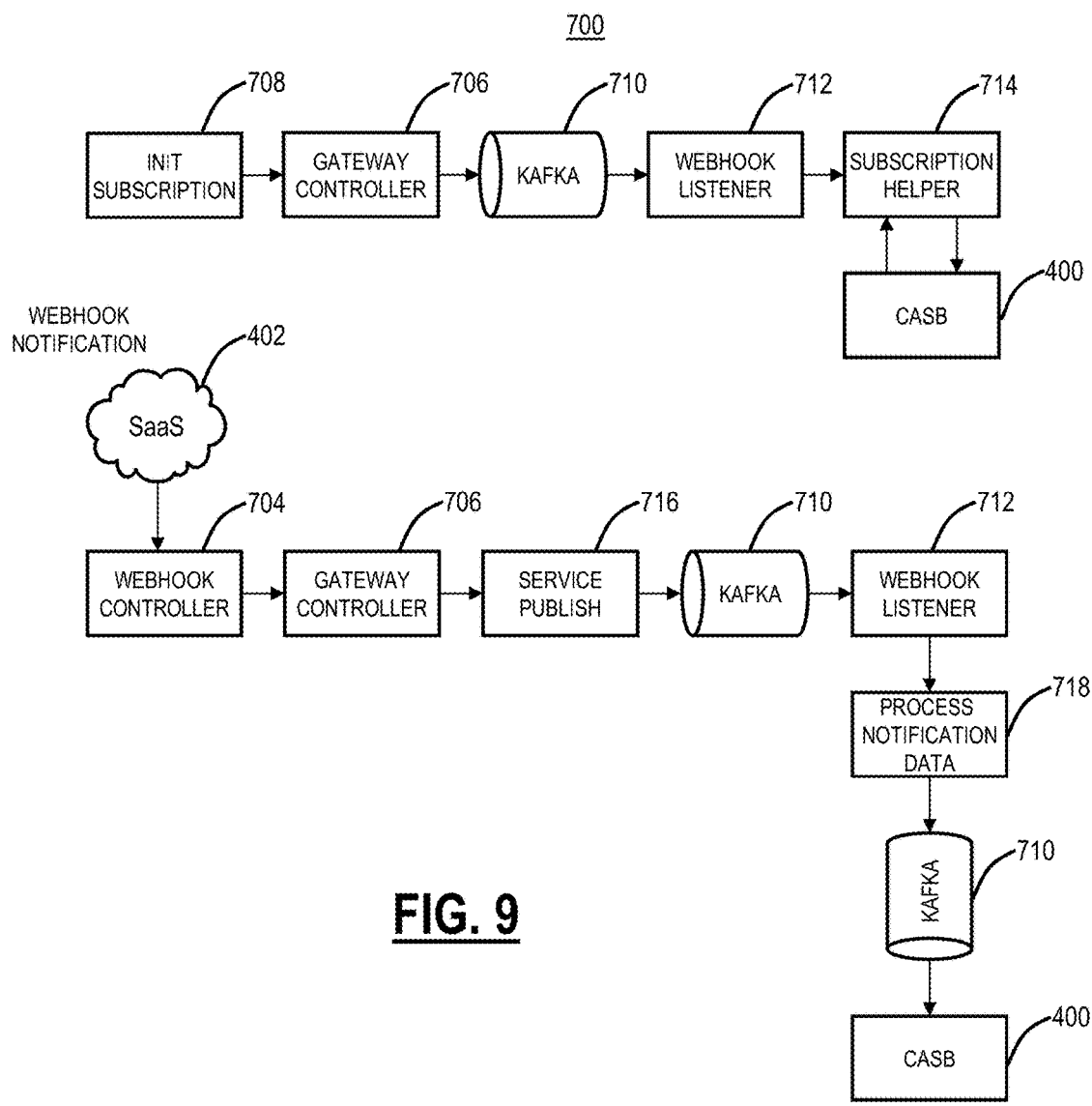
FIG. 9 is a flow diagram of an architecture of a CASB-webhooks system.

FIG. 9 is a flow diagram of an architecture of a CASB-webhooks system 700, and FIG. 10 is a flowchart of a CASB-webhooks integration process 702, which may be implemented through the CASB-webhooks system 700, or in other approaches. The CASB-webhooks system 700 and the CASB-webhooks integration process 702 operate with the constraint that there is no replication of user data. The CASB-webhooks system 700 includes various components including a webhook controller 704, a gateway controller 706, an initiate subscription component 708, a data stream processing system 710 such as Apache Kafka, a webhook listener component 712, a subscription helper component 714, a service publish component 716, and a process notification component 718.

Note, these various components 704-718 can be physical or logical components that are part of the CASB-webhooks system 700 and perform the CASB-webhooks integration process 702. The components 704-718 can be executed on one or more servers, including physical servers, virtual machines (VM) executed on physical hardware, etc. The components 704-718 can be integrated into one another, and FIG. 9 is illustrated to show functional operation. Those skilled in the art will recognize various approaches are contemplated. Also, in an embodiment, the components 704-718 can be separated from the CASB system 400. In another embodiment, some or all of the components 704-718 can be included in the CASB system 400. In a further embodiment, some or all of the components 704-718 can be included with the SaaS providers 402. Of course, a combination of any of these approaches is also contemplated. Also, any of the components 704-718 may include one of the worker 430 in the CASB system 400, as well as a worker 430 outside of the CASB system 400.

The CASB-webhooks integration process 702 includes registration (step 702-1), renewal (step 702-2), notifications (step 702-3), and triggering (step 702-4). Variously, the notifications step 702-3 and the triggering step 702-4 can be implemented by the components 704, 706, 716, 710, 712, 718, 710 in communication with the SaaS provider 402 and the CASB system 400 (bottom half of FIG. 9), and the components 708, 706, 710, 712, 714 in communication with the CASB system 400 (top half of FIG. 9) can be used to manage the subscriptions, i.e., the registration step 702-1 and the renewal step 702-2.

Generally, the registration step 702-1 involves identifying the users 102 of a tenant, and this can be a process where IT admin performs configuration through the CASB system 400. The registration step 702-1 can further include specifying monitoring functions per user, per group, per tenant, etc.

Figure 11:
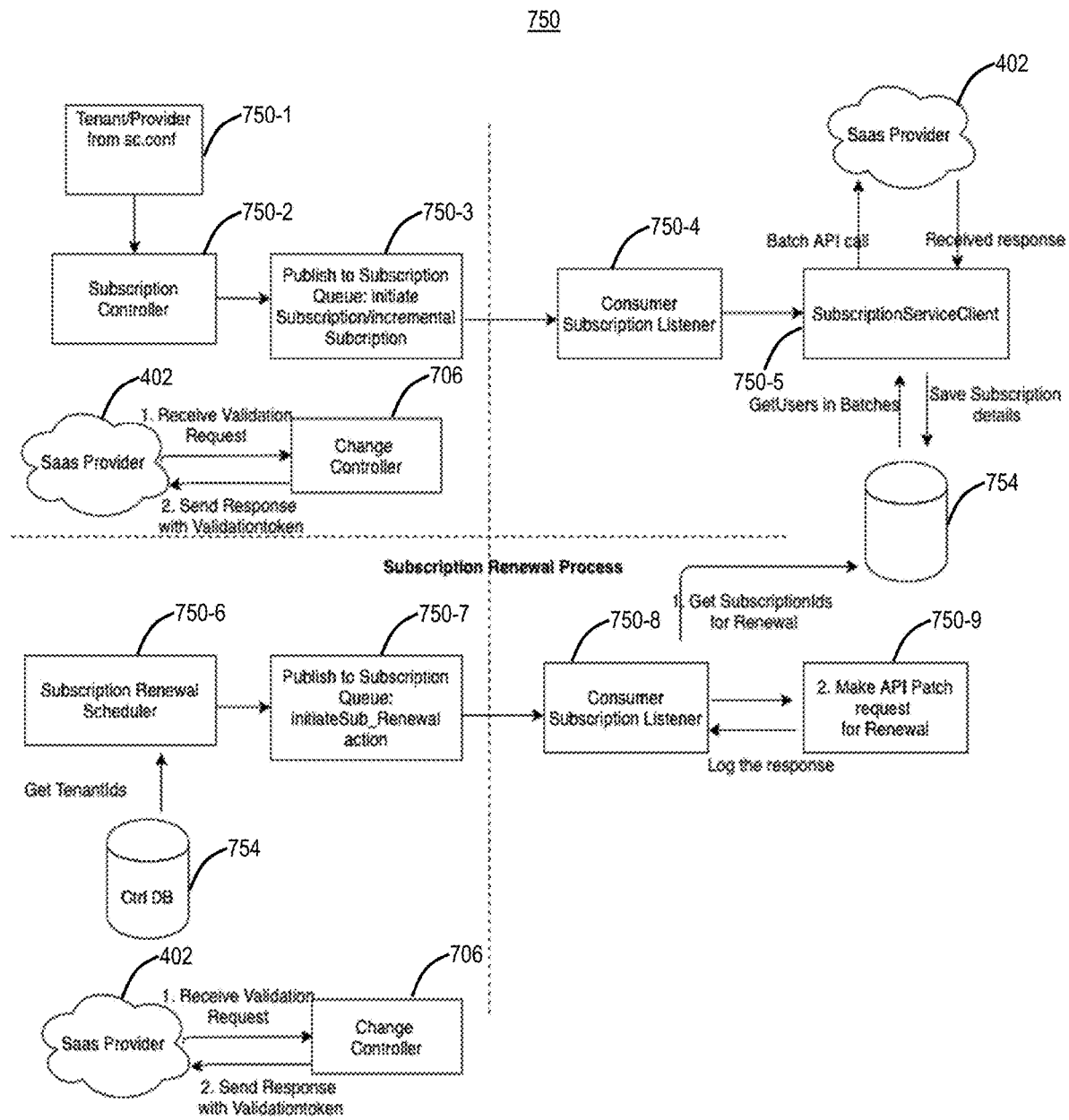
FIG. 11 is a flow diagram of subscription and renewal process for the registration step and the renewal step in the CASB-webhooks integration process.

FIG. 11 is a flow diagram of subscription and renewal process 750 for the registration step 702-1 and the renewal step 702-2. The subscription and renewal process 750 includes a tenant (or a provider) providing a configuration (step 750-1). This can be through the central authority 152, the CASB client 460, etc. The configuration can include a tenant identifier, user identifiers, actions for monitoring, content for monitoring, etc. The configuration is provided to a subscription controller (step 750-2). The subscription controller can publish the configuration to a subscription queue (step 750-3), which connects to a consumer subscription listener (step 750-4) that connects to a subscription service client (step 750-5). The subscription service client interfaces the SaaS provider 402 via batch API calls and receives responses for managing the subscriptions and configuration. This data can be stored in a database 754.

Generally, the renewal step 702-2 involves periodically renewing the subscriptions based on the timing of the SaaS provider 402. The renewal step 702-2 operates based on a timer for each different SaaS provider 402 from a scheduler (step 750-6). The scheduler publishes to the subscription queue (step 750-7), which connects to the consumer subscription listener (step 750-8). The consumer subscription listener, which can be one of the workers 430, is configured to get subscriptions that need to be renewed and to make batch API patch requests for renewal to the SaaS provider 402 (step 750-9). For subscription and renewal, the interaction between the SaaS provider 402 can be via controller 706.

Referring back to FIG. 9, generally, the components 708, 706, 710, 712, 714 communicate with the CASB system 400 for managing the subscriptions. The notifications step 702-3 includes receiving multiple notifications via webhooks that certain users and modifying certain content. The notifications can identify the user, the content, the event type (save, delete, add, etc.). The webhook notification is provided from the SaaS provider 402 based on the subscriptions to the webhook controller 704, which connects to the gateway controller 706, which publishes the notifications (service publisher 716) to the data stream processing system 710. The webhook listener 712 detects notifications from the data stream processing system 710 and causes a process notification 718, which can also be provided to the data stream processing system 710, for action by the CASB system 400.

The triggering step 702-4 generally includes taking the notifications from the data stream processing system 710 that were caused by webhooks and acting upon them in the CASB system 400. This action can include any of the monitoring and scanning functions described herein. Of note, the notifications step 702-3, and the triggering step 702-4 can be used by the CASB system 400 for detection of which users 102 to process, to identify the event type and process with delay or process instantly, etc. Further, the notifications step 702-3, and the triggering step 702-4 can be used by the CASB system 400 to identify which queue to push into.

Geolocation

Figure 12:
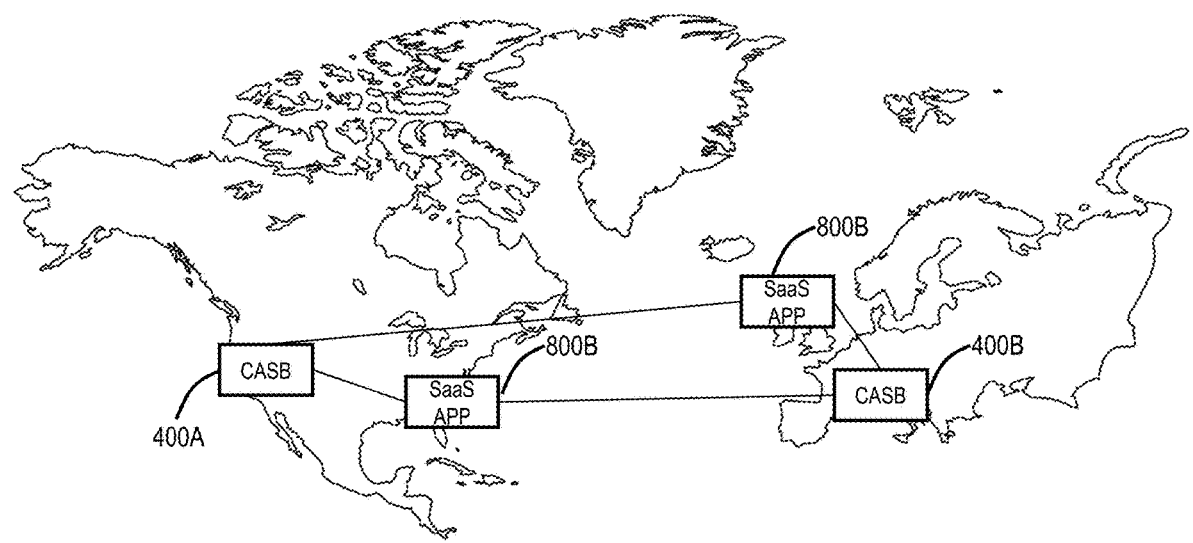
FIG. 12 is a map illustrating an example system including two CASB systems geographically distributed and two SaaS applications also geographically distributed.

FIG. 12 is a map illustrating an example system including two CASB systems 400A, 400B geographically distributed, and two SaaS applications 800A, 800B also geographically distributed. In this example, the CASB system 400A, 400B are single nodes in a composite CASB system 400. Scanning data via one of the CASB systems 400A, 400B includes downloading the data and performing policy actions or malware detection. The SaaS application 800 users in an organization can be located anywhere, and they download and upload data while using the SaaS applications 800.

Similarly, the SaaS applications 800 can distribute and store data across the globe. Thus, strategically downloading data is critical for fast actions and remediation. To achieve this, the present disclosure includes the CASB system 400 scanning data closest to the source, which is most of the time near the location of the user. For implementation, the CASB system 400 detects the geolocation of the users 102 via their user devices 300 and routes the scan requests to the closest CASB scanners, namely the CASB systems 400A, 400B. Geolocation of the users 102 can be fetched periodically.

Historical and Live Scanning Process

FIG. 13 is a flowchart of a historical and live scanning process 850 for CASB functionality. Tenants (customers) require scanning of historical data as well as live data that is being modified by users. Historical data is scanned, with the CASB system 400, by crawling the SaaS application using APIs. As described herein, the entities to be scanned are pushed into queues to be scanned. Along with historical data, the present disclosure can process live data modifications using webhooks. Notifications on changes are received, as described herein, and pushed into the queues. The CASB system 400 can then prioritizes the live modified data and perform the CASB functions. Specifically, historical scans are important, but they can tolerate latency. Live data modification requires scanning at near real-time speeds to detect problems and to limit the impact on the user 102 (i.e., the user 102 does not want to wait for each file, etc.).

The historical and live scanning process 850 can be implemented as a method, in a server 200, and as computer-readable code stored in a non-transitory computer-readable storage medium. The historical and live scanning process 850 includes causing a scan by the CASB system of a plurality of users associated with a tenant in a Software-as-a-Service (SaaS) application where the scan includes any of identifying malware in content in the SaaS application and identifying confidential data in the content in the SaaS application (step 851); during the scan which is covering historical data in the SaaS application, receiving notifications of the content being actively modified by any of the plurality of users (step 852); and including the content being actively modified in the scan with the historical data (step 853).

The historical and live scanning process 850 can further include maintaining geolocation of the any of the plurality of users (step 854); and causing the content being actively modified in the scan to be processed by the CASB system based on the geolocation (step 855). The historical and live scanning process 850 can further include prioritizing the content being actively modified in the scan higher than the scan of the historical data. The historical data can be scanned via Application Programming Interfaces (APIs) associated with the SaaS application, and the notifications of the content being actively modified are via webhooks from the SaaS application.

The historical and live scanning process 850 can further include causing an action in the SaaS application based on the scan and based on policy and the content. The action can include any of allowing a file, deleting a file, quarantining a file, and providing a notification. The historical and live scanning process 850 can further include causing the execution of a file of the content in a sandbox for the identifying malware. The historical and live scanning process 850 can further include causing queueing of the content being actively modified and the historical data.

CASB In-Memory Data Store

As described herein, the CASB system 400, such as implemented via the cloud-based system 100, is configured to perform scans of data located in the SaaS providers 402. Again, the data can include files, email, etc., and the data can be accessed by the CASB system 400 via APIs. The scan is for security and/or DLP policy, configured by a tenant. As described herein, if there is a DLP violation and/or if a file/email contains malware, this is referred to as a CASB incident or simply an incident. The present disclosure provides logging and reporting for incidents (as opposed to entire scan results). For CASB incidents, a file in the SaaS provider 402 can be modified and rescanned again and again multiple times. The logging and reporting requirement for incidents are different from the regular weblog and firewall log where the previous transactions are immutable, while incidents change. The objective here is to provide tenant IT with the current snapshot of the incidents for analysis thereof. The CASB in-memory data store describes a highly scalable and efficient incident reporting approach for the latest snapshot for a scan (for each file and email). There is a single log line recorded for each file/email that was updated when that particular file/email was last scanned.

Figure 14:
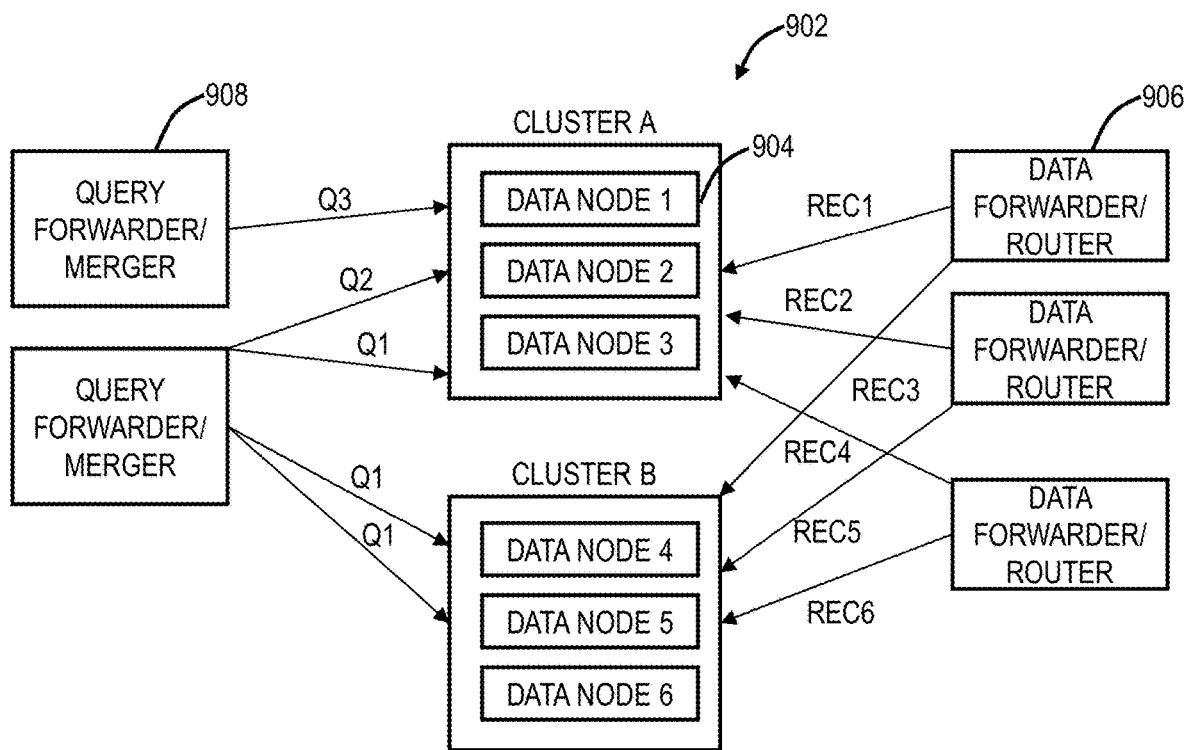
FIG. 14 is a block diagram of a CASB in-memory data store system.

FIG. 14 is a block diagram of a CASB in-memory data store system 900. The system 900 includes computing clusters 902 with various data nodes 904. The data nodes 904 are where the actual data store resides. A company (tenant) can reside in one or more clusters 902 at the same time. Also, a company can historically reside in one cluster 902 and migrate to another cluster 902 as part of load balancing for the clusters 902.

The CASB in-memory data store system 900 includes data forwarder/router nodes 906 and query forwarder/merger nodes 908. The data forwarder/router nodes 906 are configured to route logs, obtained during a scan with the CASB system 400 and based on an incident, to appropriate cluster 902. The data forwarder/router nodes 906 perform the routing function for incidents. Note, the data forwarder/router nodes 906 have intelligence, i.e., processing capability to receive a log and to determine which cluster 902 to forward it to. Note, the CASB system 400 can be multi-tenant, and the data forwarder/router nodes 906 know the topology for each tenant, and this is used to forward a particular log, such as based on metadata identifying a tenant, to the cluster or clusters for that particular tenant. Also, if a company (tenant) is spread across multiple clusters 902, the data forwarder/router nodes 906 can be configured to provide a log to all of the multiple clusters 902, such as via metadata. For example, in FIG. 14, assume there are two clusters 902 A and B, if a tenant is on both, the data forwarder/router nodes 906 attempt to distribute the log (record) equally among each cluster 902. In an embodiment, the receives the log for each incident from a worker 430 in the CASB system 400.

The query forwarder/merger nodes 908 are configured to receive queries from an external source and performs such queries through the data nodes 904. All requests (queries) land on query forwarder/merger nodes 908 and a node, based on a metadata of the tenant to cluster mapping, performs query planning, sends requests to clusters 902, and, if the query has been sent to multiple clusters 902, it will merge the results and send responses back to the client (requestor). Similar to the data forwarder/router nodes 906, the query forwarder/merger nodes 908 have the state to route the queries to a particular cluster 902, including multiple clusters 902 where a tenant is spread. Once the query forwarder/merger node 908 receives a response, it merges the results if there where multiple clusters 902, and sends the result back to the client.

Data Store Design and Data Structure

Figure 15:
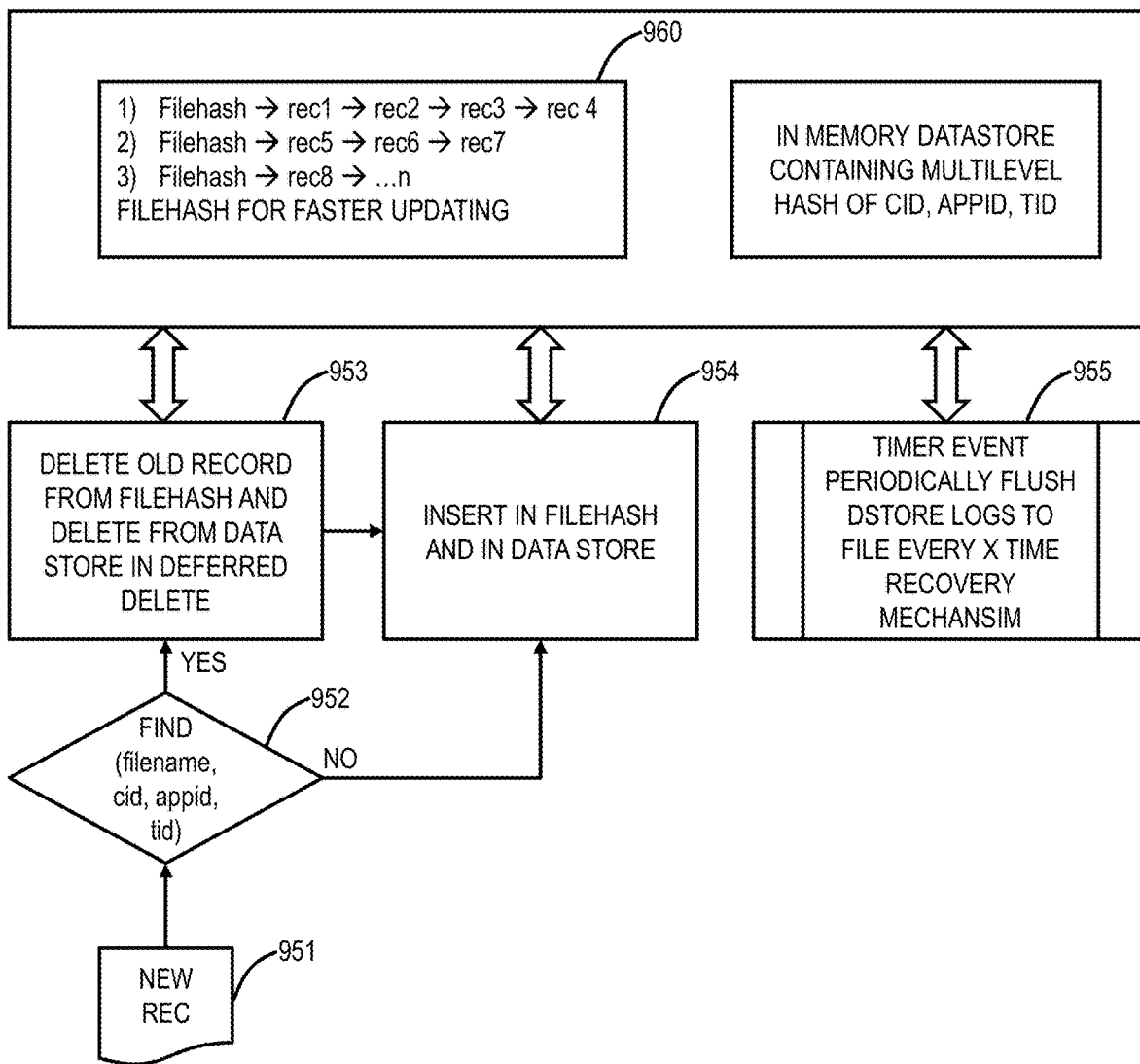
FIG. 15 is a flowchart of a record processing process implemented in the data store of the CASB in-memory data store system of FIG. 14.

The data store in the CASB in-memory data store system 900 supports various operations including an insert operation, a delete operation, an update operation, and a recovery mechanism to rebuild the data store in case of a service restart. FIG. 15 is a flowchart of a record processing process 950 implemented in the data store. The process 950 describes how update, delete, and insert operations are performed.

A new record is received (step 951). In case of any new record (step 951), the process 950 includes checking if entry exists in a filehash in a data store 960 (step 952). If so (step 952), it means the process 950 has seen that file earlier, and the old record is deleted from the filehash and deleted from the data store in a deferred delete, described herein (step 953). If the file does not exist in the filehash in the data store 960 or after the delete step 953, the record is inserted in the filehash in the data store 960 and in the data store (step 954). For a recovery mechanism, the process 950 can include periodically flushing the data store logs to a file (step 955). This can be every so often, based on a trigger event, etc.

The data store is mutable in-memory for highly-optimized updates and reports, for the most common dimensions of filtering, aggregation, and pagination. In the CASB system 400, the most common dimensions are application name (appname or application ID) and tenant name (i.e., the user 203). As such, all reports are around these dimensions.

Figure 16:
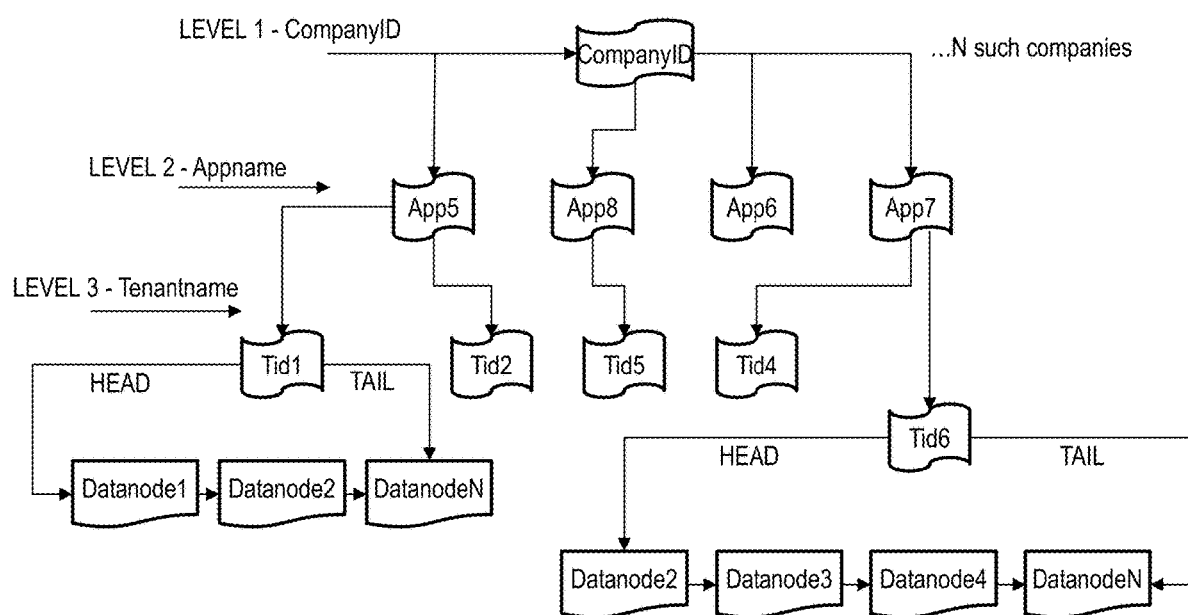
FIG. 16 is a diagram of an example implementation of the filehash from the data store of the CASB in-memory data store system of FIG. 14.

FIG. 16 is a diagram of an example implementation of the filehash in the data store 960. The filehash in the data store 960 is stored in the data store and can be a multilevel hash that includes a hash of a customer ID, application ID, tenantname ID, etc., where data is hashed by company, application name (appname or appid), and tenant name (tenantname or tid). At the leaf level, a list of actual records is stored. This data store will always contain the latest incident information for any file and for a particular combination of (appname, tenant, filename), only one entry is present, referred to as a datanode in FIG. 16.

Also, the following facts are noted and assumptions made. A file or email that is being scanned can belong to only one tenant (user), and a tenant can belong to one application. The maximum scan duration supported by the data store is for a certain period of time. Older scan results will be cleaned up periodically by the product. Most reports come with company, appname and tenant filters. Majority of the aggregation queries are on the filenames/email. So, the data store optimizes these reports.

The following provides pseudo code for the filehash in the data store 960:

```
1)   New rec received
2)   Check if already same file exist for cid,appid, tid combination
In filehash
filehash = smhashapi_keymd5_old(filenamep, filelength);
     head=&smslave_file_hash_table[(datanode->filehash)
     %SMSLAVE_FILEHASH_SIZE] ;
_TAILQ_FOREACH(entry, head, filehash_entry) {
     If (cid, appid and tid matches)
     /* delete old record if it is not referenced both from this table as well
       as from inmemory
       /* data store
       }
3)   #define PREPARE_KEYREC(_cid, _appcat, _appid, _tid)
     keys[keycnt++]._u_int = _cid;
     keys[keycnt++]._enum = _appid;
     keys[keycnt++]._u_int = _tid;\
This will be used to find or insert record at which leaf node that is to be put in the in-memory data store
4)   Find leaf node for zks_prefix_tree_schema_get
(ctx->ptp_dstore, keys) for keys prepare in step (3)
This will give us the head of list where actual complete record is stored.
 5) _TAILQ_INSERT_HEAD(head, datanode, comp_list_entry)
This will make sure records are stored in descending order of time.
```

Data Duplication Prevention

In the CASB in-memory data store system 900, data is distributed across the nodes 904 in clusters 902 based on some hash functions (e.g., key % noOfnodes) and records based on some key that can also be updated/deleted in mutable systems. But when any node 904 is added or deleted, the hash function can give different nodes for a key which was earlier sent to node A and later the hash function sends to another node B leading to multiple copies of the same mutable record being on different nodes 904, leading to inconsistency in data. This scenario can occur when a company moves from one cluster to another cluster as part of the load balancing.

Figure 17:
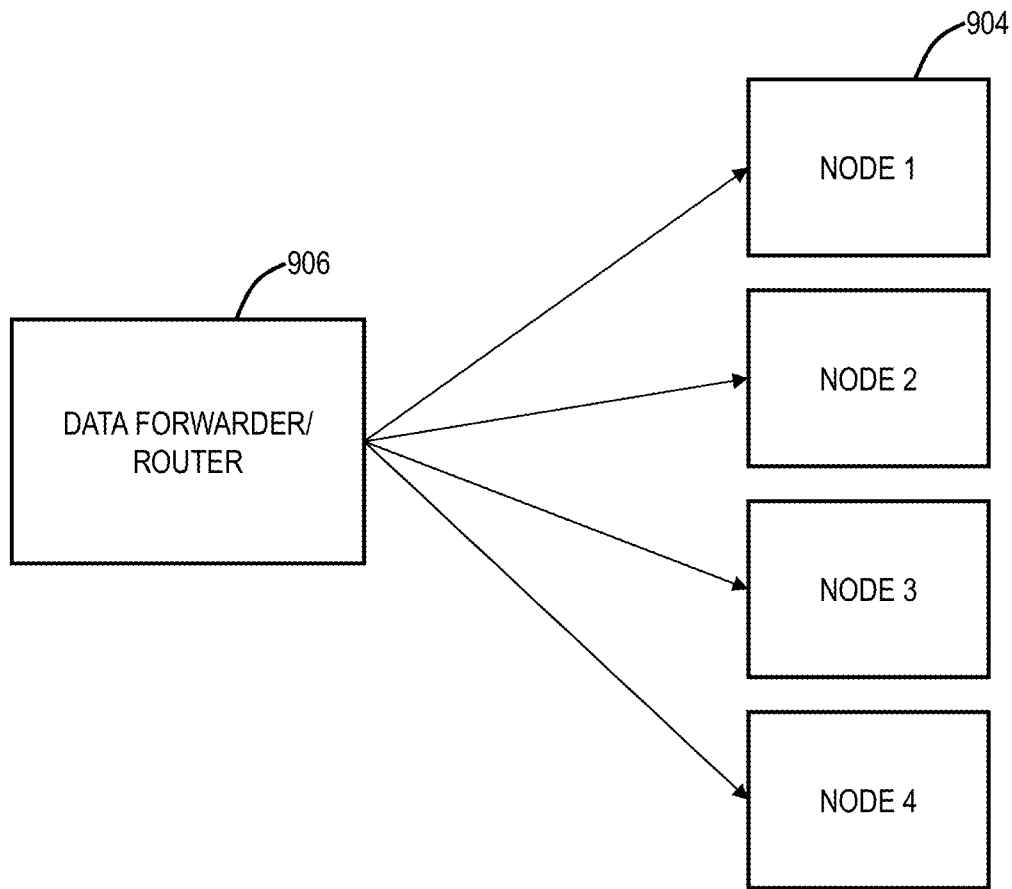
FIG. 17 is a diagram of data duplication prevention in the data store.

FIG. 17 is a diagram of data duplication prevention in the data store. To make sure that the only one record of a key lies across all the nodes 904 in a cluster 902, whenever any node addition happens, a broadcast is sent to delete that key to all of the nodes 904 in the cluster 902 except the current node which the hash function distributes to. In that way, all nodes 904 which have an old record of same key will delete their record and only one node will have the record.

Suppose in the CASB in-memory data store system 900, there is data with a key as FILED distributed uniquely among 3 nodes (Node 1, 2, 3). FileId 4 belongs to Node 2. Now, Node 4 is added and due to this, the data forwarder forward it to Node 4 leading to multiple copies of FILEID 4. During this time, the data forwarder/router node 906 detects that node addition has been done in last X days and there can be chances that this data might be lying on other nodes, the data forwarder/router node 906 sends a DELETE record of that key (in this case FILEID 4) to all other nodes which might be having this older record and each node manager handles the delete record in Deferred delete way which is covered next.

Deferred Delete on Data Manager

Data managers cannot delete a record blindly without checking a reference for that record otherwise it will show inconsistent record when query/report runs. A deferred delete includes, suppose a query is running and referencing the data store, and a delete record is received where a query is also running. The data manager checks if the record is referred by a query manager, and if yes, puts that record into a deferred list and marks it a soft delete. Whenever the reference of that record becomes zero, the data manager deletes that record.

For insertion, it is checked from another file-based hash whether an entry is already there in the data store, and, if yes, delete that record using the deferred delete operation and insert the new one. Insertion is fast as the process just needs to find a particular tenant hash bucket and insert at the head.

Benefits of Maintaining a Unique Key Across Nodes

In distributed query engines, most of the expensive queries are related to count distinct queries on high cardinality fields with aggregates. Consider the use case for the following query:

"from CASB select count(distinct filename) where companyid=1 group by appname, tenantid"

The above query is an expensive query as it needs to maintain the list of all files in memory to resolve duplicates and count the filenames after all data has been read. Due to the nature of the data store (multi-level hash), this complex count distinct query on unique keys can be converted into a normal count query leading to faster response time. Thus, the query is converted to "from casb select count(1) as unique files where cid=1 group by appname, tid"

Instead of maintaining the entries for each file, it just needs to read and count the rows as duplicates are removed at the time of record update.

Reporting Design and Optimizations

A query request can come to query forwarder/merger node 908 for following kind of companies:

a) Company which is not distributed across multiple clusters 902. In this case, requests need to be processed from an in-memory data store lying on a single data node and the node 908 acts as a forwarder for these kinds of queries.

b) Company which is distributed among multiple clusters 902. In this case, requests need to be processed from many in-memory data store lying on different clusters 902 and the node 908 acts as query planner and merger for these kinds of queries.

For all these requests, optimized filtering and aggregation operations are needed to have faster response time and reduce the resource utilization.

Filtering

The most common reports require filters on appname and tenant name. The data store is maintained such that if any such filter comes, it is possible to apply filtering at the hash level instead of reading all records. This will be applied at the hash level and once level filtering is passed, data can be directly passed to the consumer without applying the same filter again and again on each record.

Advantageously, a chain of records is filtered by applying a filter at level of in memory data store 960 skipping filter check for each record. This technique of using in-memory data store 960 for filtering can be done for other use cases.
Inbuilt cache for popular reports (Group by Appname, tenantname)

The data is stored in a multi-level hash (FIG. 16) that includes company, application and tenant nodes. These nodes are the parent to underlying child nodes that contain the incident scan results. These nodes can work as a cache to store the summary of the underlying logs. For example, each application node can store the following information:

i) Count of malware incidents in the underlying nodes, e.g., from CASB select count(transactions) where malware>0 where appname=BOX group by tenant;

ii) Count of DLP violation, e.g., from CASB select count(transactions) where DLP>0 group by appname, and iii) number of files in the tenant.

The count on the parent nodes are updated when a new incident is added/modified in the data store 960. The data update operation will be negligible because each file belongs to only one<company, appname, tenant>combination.

Since the data store 960 supports the scan reports for the last X days (e.g., 90 days), the parent nodes can store the counts for each separate day by maintaining X buckets. All the reports starting with day boundary time can be served from the parent node cache.

Pagination for Aggregate Reports

In a distributed data system, running aggregation based queries on high cardinality fields can be very expensive. For example, from CASB select count(distinct filename) as trans group by ownername limit 25 offset 0. Here, the filename can have high cardinality in the range of millions, the ownername can have medium cardinality in range of 100's of thousand, and, in this query, a user wants to see 25 aggregated records.

The query forwarder/merger node 908 can send this query to all the individual data nodes 904, which can each have a query manager, and the query manager processes the query as follows:

1) start reading data and create hash based on ownername column;

2) for each hash bucket (unique ownername values), maintain unique distinct filename values; and 3) once data read is finished, take 25 bucket and count unique A values and send results.

In this approach, even if the query forwarder/merger node 908 asks for 25 aggregate records, the query processor is processing all 100 k unique B entries and maintaining a hash for all the buckets leading to query slowness. Also, the hash lookup for all the values of aggregating column which will be processor intensive and maintaining hash for all the values of aggregating column will take too much memory.

To solve this issue, the query forwarder/merger node 908 forwards the request to each query processor on each node 904 and asks for 25 records from each query processor. The query processor maintains a hash for 25 entries instead of maintaining a hash for all the 100K unique entries The query processor maintains metadata of the aggregated column which it has seen previously. The metadata is used to skip previous run response entries which the query processor has already sent. When this request is received the first time with offset 0, the metadata will be empty. The following steps for the first run are as follows:

a) start reading data and create hash based on ownername column.

b) once a hash contains 25 unique entries (limit count), the query manager creates a filter with these values and starts dropping entries for the rest of (100 k–25) entries instead of maintaining hash and doing lookup. This will help in reducing memory footprint and query faster.

c) once the query is finished on the query node, each query node will send its result to the query forwarder node 908 and each query processor on that node maintains metadata of these unique entries for the next pagination request if it comes.

The steps for the second run where a client requests the next 25 records:

a) the query processor starts reading data and puts the entry into the hashtable only if it does not belong to metadata entries (previous run response unique entries);

b) now when a hashtable contains unique 25 entries, the query manager creates a filter with these values and starts dropping entries for the rest of entries instead of maintaining hash and doing lookup;

c) once the query is finished on the query node, each query node will send its result to the query forwarder and each query processor on that node updates metadata of these unique entries for the next pagination request if it comes; and d) now metadata will have 50 entries (25 for 1st run and 25 for 2nd run).

The same can continue for the next pagination request.

Advantageously, this reduces the memory footprint for the query engine as there is no need of doing aggregation for all the values of a dimension, and the response time will be faster.

For queries spanning multiple in-memory data store nodes 904, the query forwarder/merger node 908 will merge the results and return the result to the client. For a single in-memory data store, the query forwarder/merger node 908 will forward the result to the client.

Stateless Query Execution Engine with Cached Support

For all expensive queries, the results can be cached after the query execution. The cache could be used by the subsequent queries in the following cases:

i) a similar query is received from another user and the cached results can be served directly to the client.

ii) The cached data structure can be further processed to produce the report. In this case, the query will be faster as it will be working on a subset of data rather than a complete data store.

For example, suppose the first query is

"from CASB select count(distinct filenames) group by appname, tid"

In this, once the query is finished, the results are sent and saved in cache with an Abstract Syntax Tree (AST) acting as metadata for query matching.

For example, suppose a second query is

"from CASB select count(distinct filenames) where appname=BOX group by tid"

Once the query is parsed, the query engine will try to check based on incoming Query AST (Abstract Syntax Tree) by matching it previous query AST's and see if it matches. In this example, group by clause AST match, cache contains appname and tid and the query contains tid only so this query can be run as subset of original query.

If the select clause also matches, where the clause of the 2nd query is also a subset of original query as original query contains data for everything and also appname field in where clause is present in group by AST of cache query (appname). In this case, the query will be faster because it is not reading all the data, it is just reading the aggregate results and from there deriving response for this query result.

For example, suppose a third query is "from CASB select count(distinct filenames) where ownername like (\"abhishek\") group by tid"

Here, the group by AST is subset of group by AST of query cache (query 1), the select clause AST is subset of select AST of query cache (query 1), and the where clause AST does not match cache AST because ownername field is not there in group by AST, select by AST of cache AST.

Algorithm a) if a filter matches multilevel keys (appname or tid), it converts it into level filter;

b) if it is a count distinct query on a unique key with a group by multilevel keys convert it into a normal count query.

For example "from CASB select count (distinct filename) group by appname, tid," this can be converted to from CASB select count(filename) group by appname, tid.

c) count based queries multi-level hash keys can be served from node count metrics instead of walking through multi-level hash leaf entries. In this, the query engine producer will be just passing the level key and metrics to consumer instead of passing each record.

Sample Queries from casb_fileapps select count(distinct filename) as tot_dlpincidents where appname=BOX and ANY(dlpdictids)!=0"→output: tot_dlpincidents=34.

from casb_fileapps select count(distinct filename) as unique_fileincidents, id2name(ownerid) as ownername group by userid ownerid limit 100"→output ownerid,unique_fileincidents,ownername, 65761,130,traffic_loc->other, 65786,1,ca_loc.

from casb_fileapps select time as time, filename as filename, appname as appname id2name(tid) as tenantname, dlpdictids where ANY(dlpdictids)!=0 limit 2"→output 1594175160, one.txt, BOX, ca_loc, [61,62], 1594167110, casb_test.txt, GDRIVE, g_tenant, [1,3].

CASB UI

The CASB UI systems and methods including onboarding, policy configuration, reporting, advanced reporting, security exceptions, etc. Each of these is described as follows with associated UI screens and actions by an IT administrator (user). The onboarding supports configuring new cloud applications for the CASB 400, including, for example, OneDrive, SharePoint, Exchange, Box, Google Drive, Gmail, Dropbox, and the like. The policy configuration relates to configuring DLP and/or malware rules for the onboard cloud applications. The reporting and advanced reporting are utilized to provide users a uniform view of CASB operations in the onboard cloud applications (SaaS).

Starting with a SaaS Data Exposure Report, the customer gets a high-level overview of the number of assets being exposed to incidents for the entire organization. Tenant-level details are shown per application with an accordion, which can be expanded or collapsed on demand. The customer could then drill down to see the report for a specific application or tenant. The application/tenant-level report is broken down into three main sections: Assets with incidents; Owners of the assets with incidents; and Collaborators of the assets with incidents.

The sections could be further broken down by the incident type or collaboration scope, which allows the user to filter the numbers. The table-based report will show the detailed information of assets/owners/collaborators. For example, for each asset, it shows the path, owner, severity, etc. The customer could easily see the scan history for this asset, in particular, to investigate what incidents it has generated.

In CASB Report, organizations can get the analytics of how to manage and protect the data stored on the cloud. This will also protect and prevent the loss of sensitive data across all cloud services in an environment. This report includes a clean interface in which users will get to know how their policies are enforced.

The UI includes pie, multi-line, and bar charts to complete the design to display a massive amount of data, including re-rendering based on the user actions. The system is able to effectively handle the large set of data and render the most sensible segment of data with a minimal resource utilization (browser cache, RAM).

FIGS. 18-35 are screenshots of a UI associated with the CASB system 400. The screenshots can be displayed on a display such as associated with the user device 300, e.g., via a Browser, via a dedicated application, etc. The user device 300 can be connected to the controller 450 and/or to the cloud-based system 100. That is, the rendering of the UI can be via the controller 450 or any of the nodes 150, 152 in the cloud-based system 100. The UI includes a dashboard tab, an analytics tab, a policy tab, an administration tab, an activation tab, etc.

Onboarding

Figure 18:
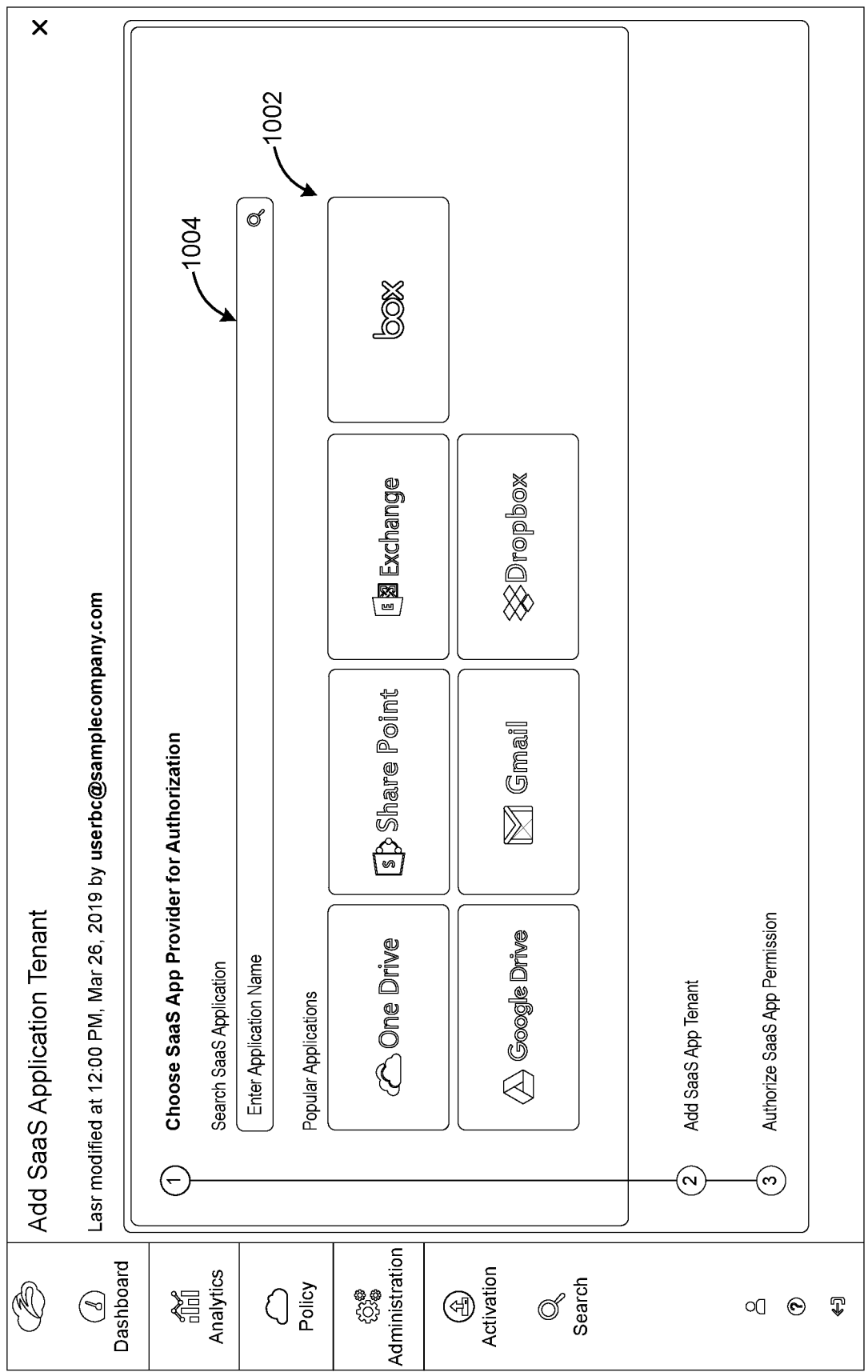
Figure 19:
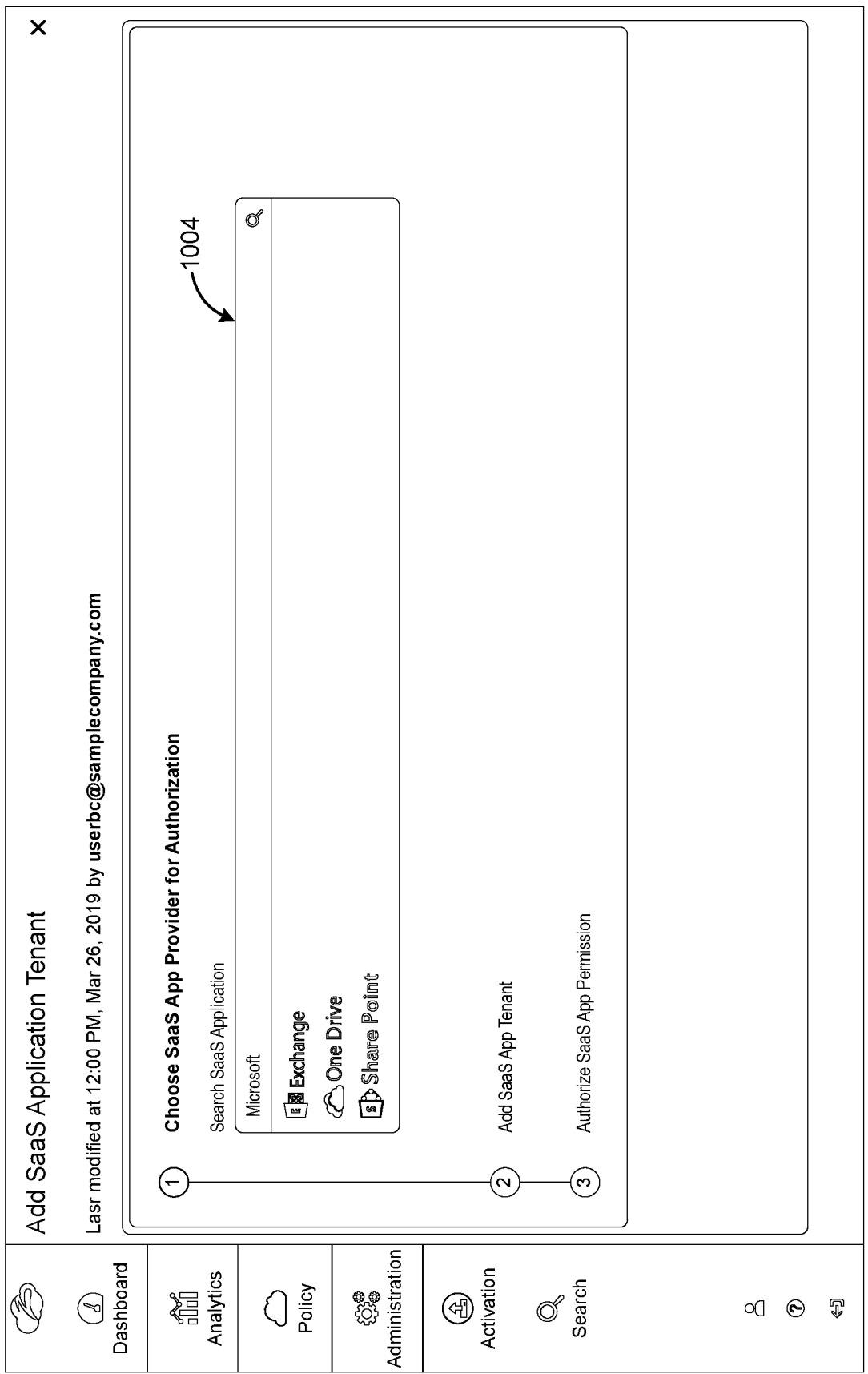
Figure 22:
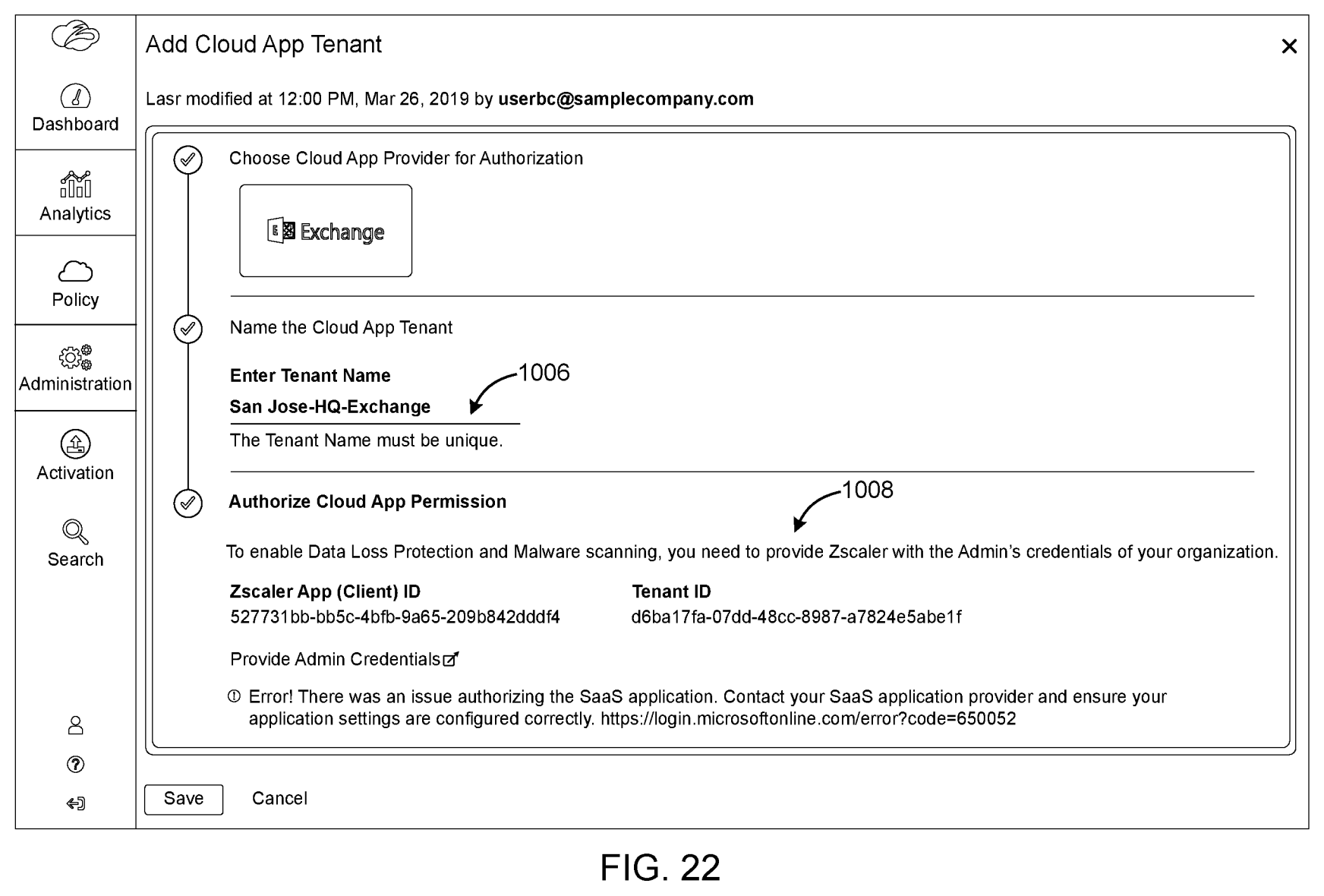
Figure 23:
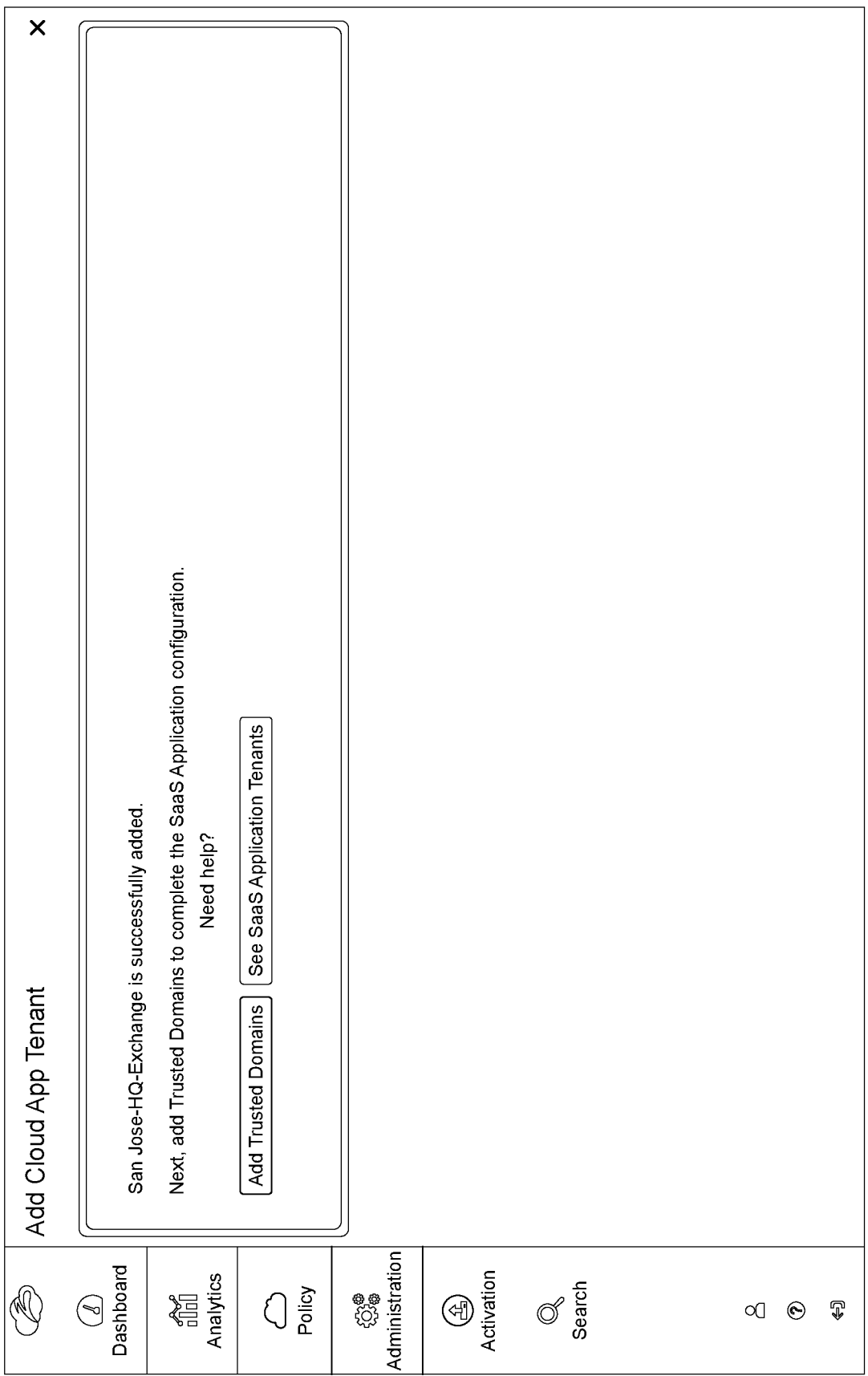

FIGS. 18-23 are screenshots of an onboarding process for enrolling an organization through the CASB system 400 with a SaaS application. The onboarding process is under the administration tab. In an example embodiment, the CASB system 400 supports OneDrive, SharePoint, Exchange, Box, Google Drive, Gmail, and Dropbox for the SaaS applications. Of course, other SaaS applications are also contemplated. In FIG. 18, a user (i.e., IT administrator, etc.) is presented an Add SaaS Application Tenant screen. For example, popular SaaS applications are displayed (via boxes/icons 1002) as well as a data entry box 1002 for manually typing in the SaaS application. In FIG. 19, a user types "Microsoft . . . " in the data entry box 1002 and is presented with three options for SaaS applications—Exchange, OneDrive, SharePoint. data entry box 1002. In FIG. 20, Exchange has been selected and the user supplies a tenant name 1006 and credentials 1008 for enrollment. FIG. 21 is a similar onboarding screen for Dropbox. Those skilled in the art will recognize these onboarding screens will be specific to the SaaS application. FIG. 22 is a screenshot of onboarding failure, and FIG. 23 is a screenshot of onboarding success. After the onboarding success, the user can list trusted domains and trusted users for accessing the SaaS application.

Policy

FIGS. 24-27 are screenshots of a policy configuration process, subsequent to the onboarding process. The policy configuration process is under the policy tab and allows configuration of DLP, malware, and scanning configuration policy. In this example, Exchange is selected as the SaaS application for illustration purposes. In FIG. 24, the user selects the DLP configuration for Exchange including selection of one or more DLP engines and actions (report incidents only). In FIG. 25, the user selects the malware detection for Exchange including malware protection and a quarantine location. FIG. 26 illustrates an example DLP Rule for Email application tab, and FIG. 27 illustrated an example Add Malware Rule for Email application.

Reports

Figure 28A:
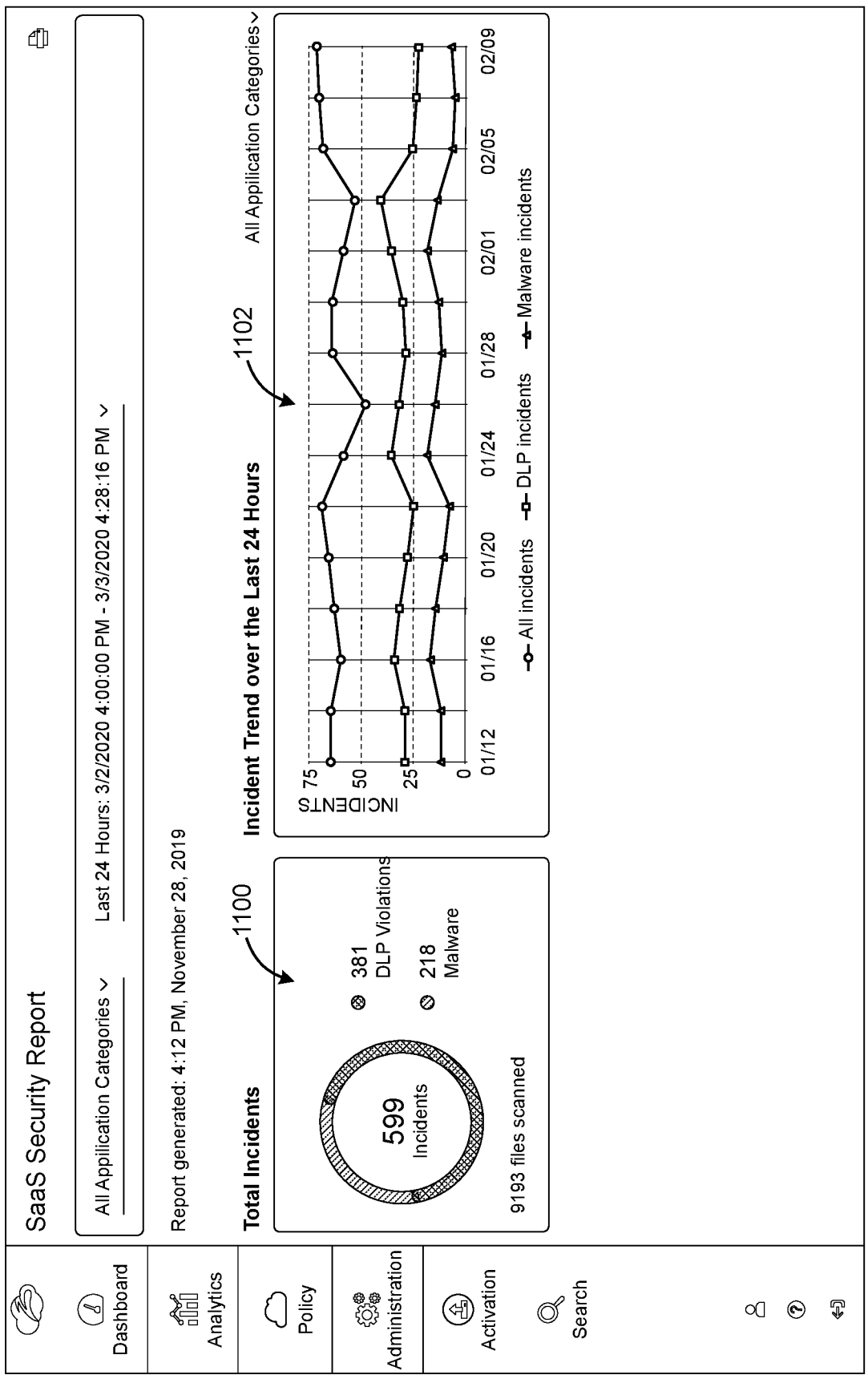
Figure 28B:
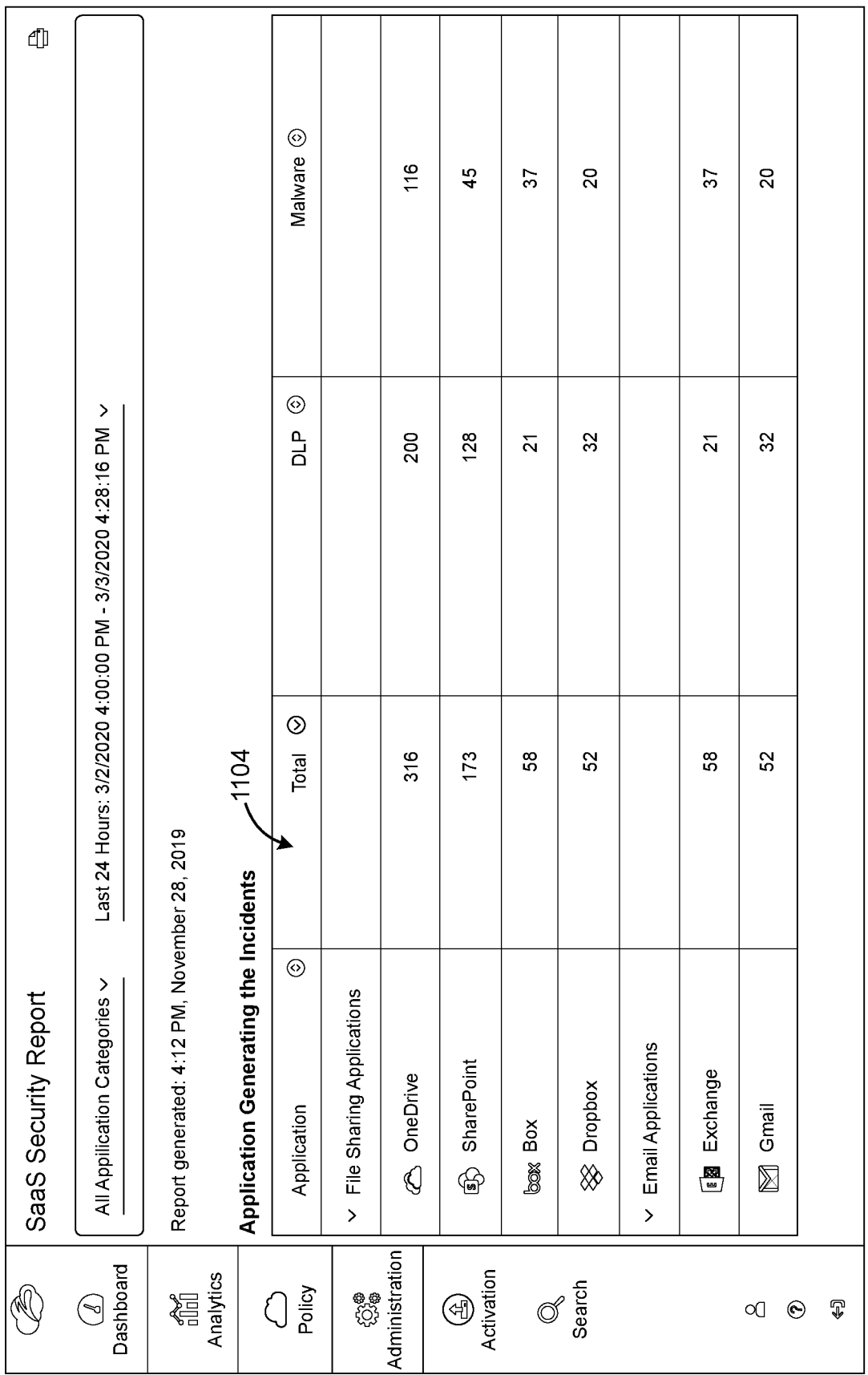
Figure 29A:
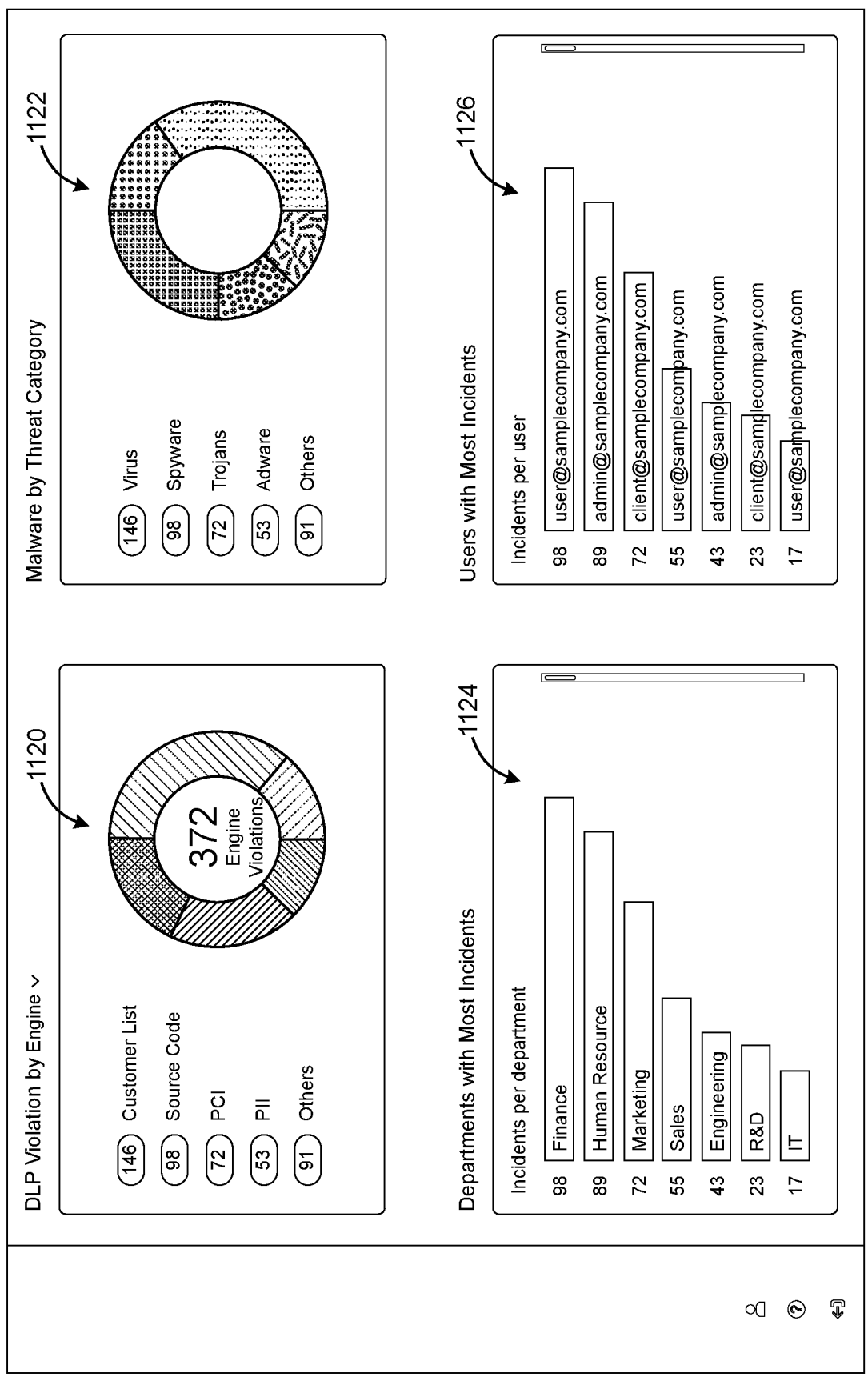

FIGS. 28-35 are screenshots of various reports and visualizations associated with monitoring through the CASB system 400. FIGS. 28 and 29 are a view of the analytics tab, specifically FIG. 28 can be a first top of the screen whereas FIG. 29 can be a bottom half of the screen. FIG. 28 includes a pie chart 1100 of incidents split between DLP violations and malware, a line chart 1102 that illustrates incidents over time (separate lines for all incidents, DLP incidents, and malware incidents, and a table of SaaS application illustrating onboard SaaS applications with a number of total incidents, DLP incidents, and malware incidents.

FIG. 29 includes pie charts 1120, 1122, bar graphs 1124, 1126, and a table 1128 of risky cloud applications in use. The pie chart 1120 illustrates DLP violations split by different DPI engines (e.g., customer list, source code, etc.). The pie chart 1122 illustrates malware by threat category (e.g., virus, spyware, trojans, adware, etc.). The bar graph 1124 illustrates an organization's departments arranged by the most incidents, and the bar graph 1126 illustrates the organization's users by the most incidents. The table 1128 lists risky cloud applications and their associated category (e.g., file sharing, social networking, etc.), threat index (a value indicative of risk), bandwidth statistics, and recommended remediation (caution, block, etc.).

Figure 30:
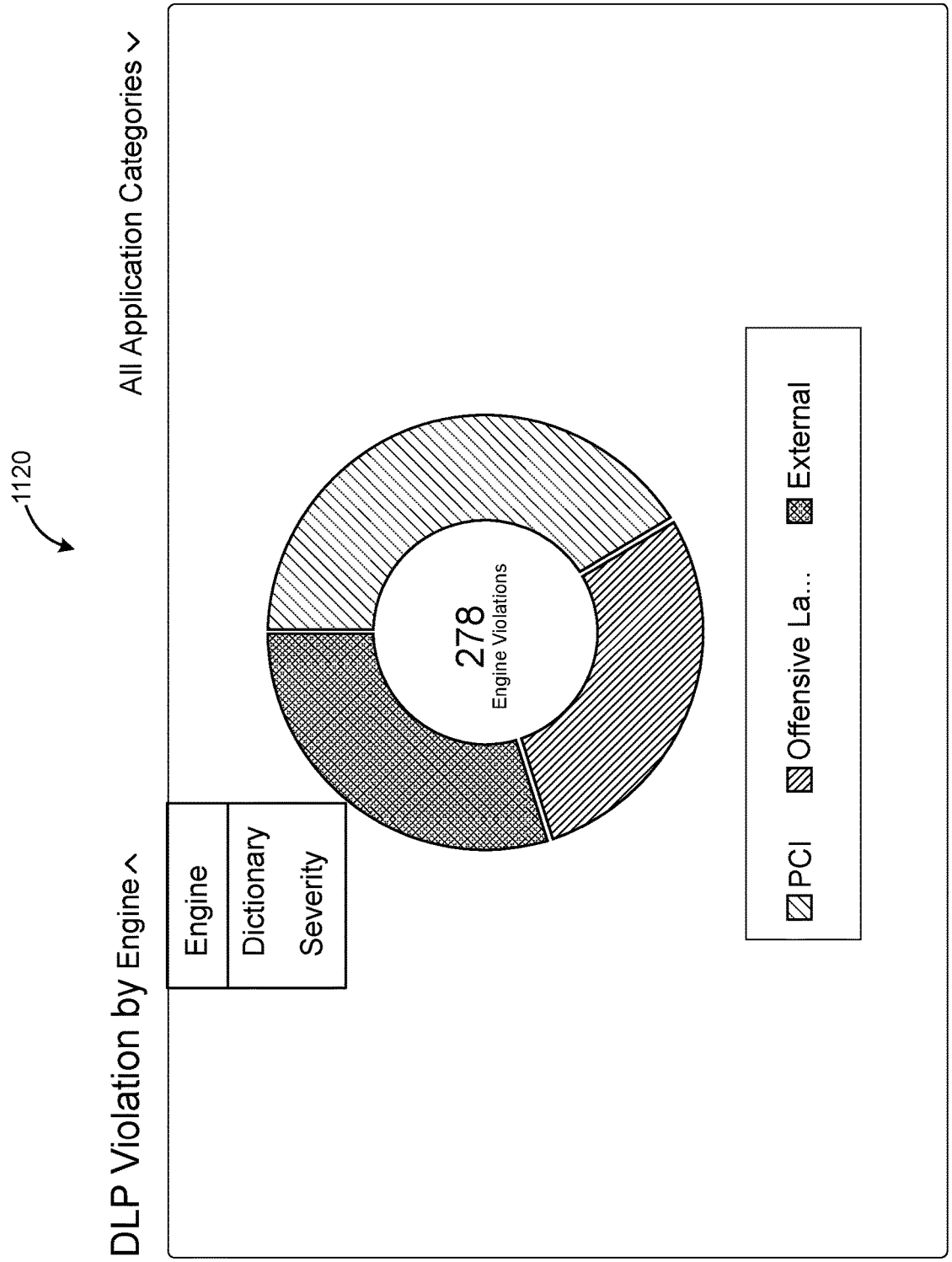
Figure 31:
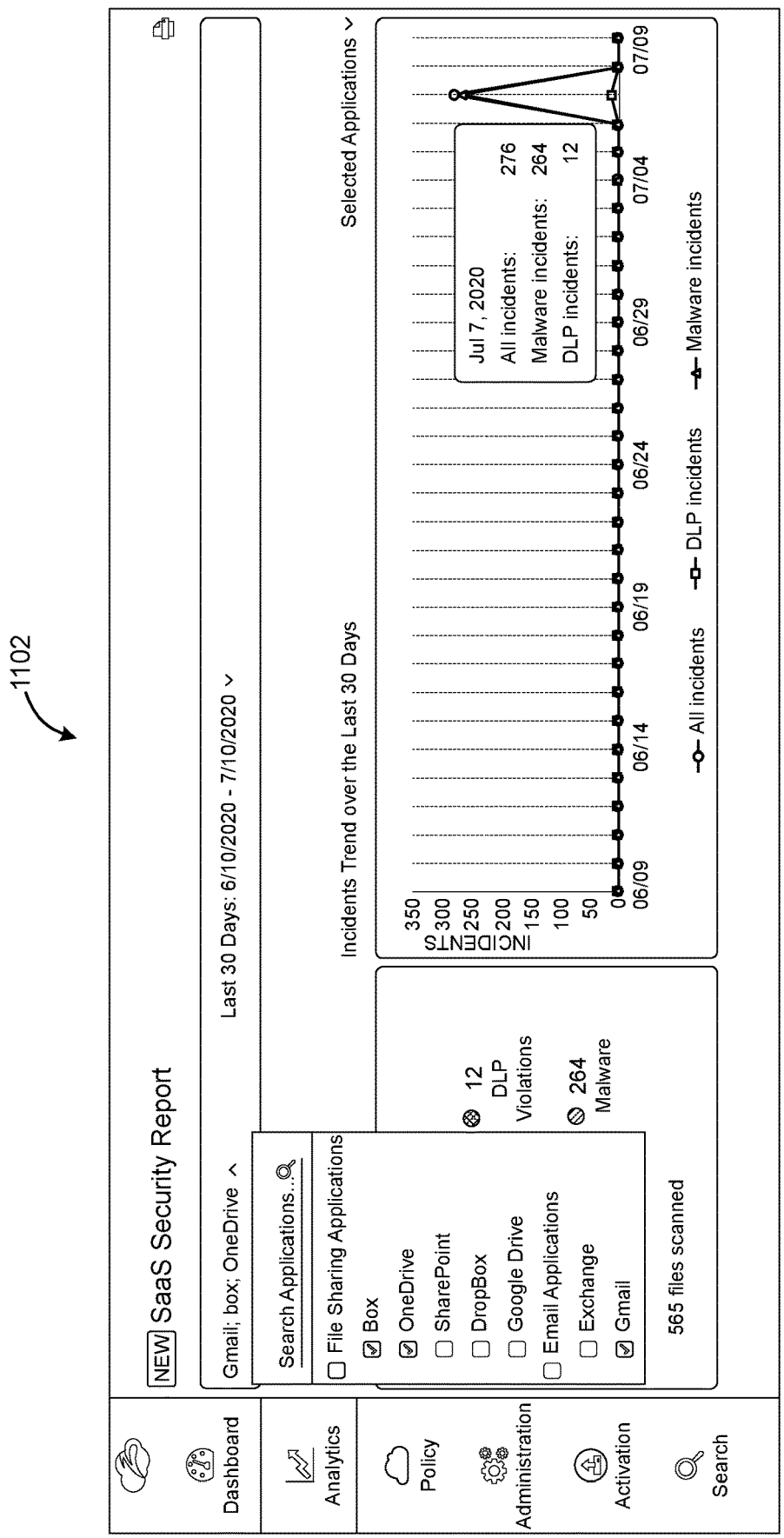

FIG. 30 is the pie chart 1120 illustrating an ability to change the values. For example, the pie chart 1120 can display values by DLP engine, by DLP severity, and by DLP dictionary. FIG. 31 is the line chart 1102 illustrating an ability to change the data. Specifically, the line chart 1102 can show values over a customized time, by select or all SaaS applications, etc.

Figure 34:
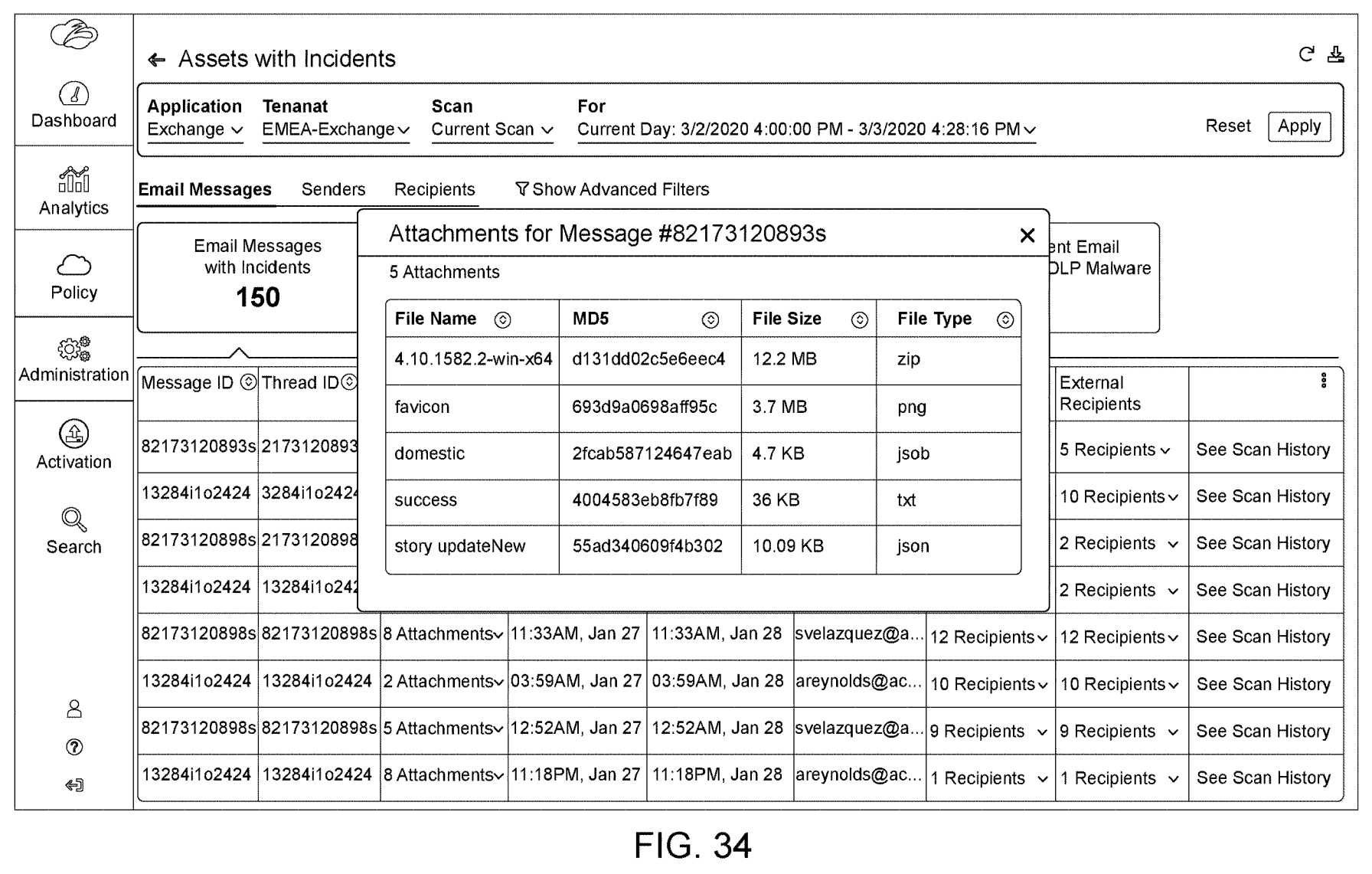

FIG. 32 is a table 1130 of an insight log that lists specific CASB incidents, including event time, policy type, application, rule name, action, and tenant. FIG. 33 is a table 1140 of email messages with incidents and tiles 1142 illustrating summary values. FIG. 34 is a pop up 1150 when a user selects a specific email in the table 1140.

Asset Reports

Figure 35A:
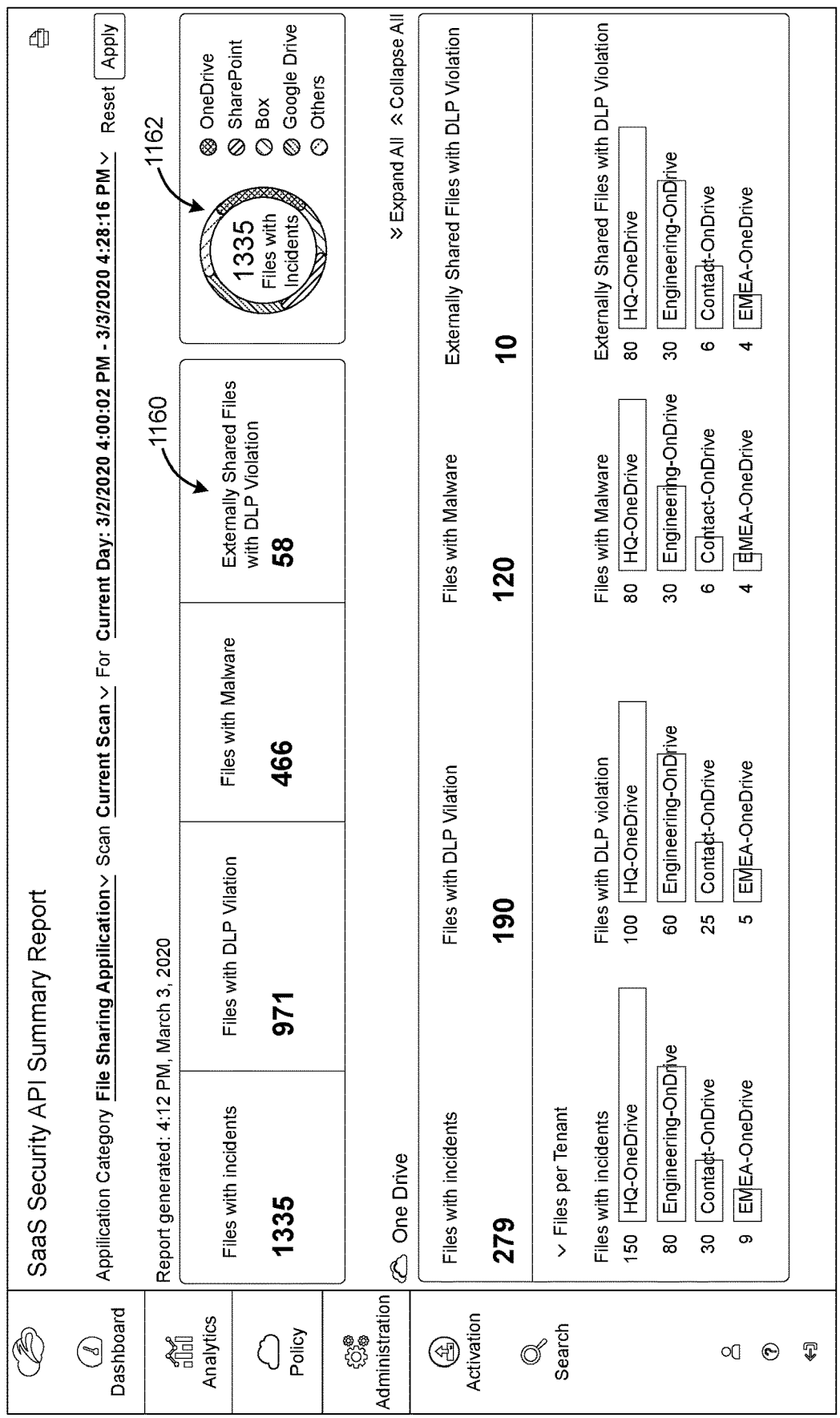

FIG. 35 is a screenshot of a SaaS summary report for an organization. This includes different SaaS applications with summary values, e.g., files with incident, files with DLP violations, files with malware, and externally shared files with DLP violations. In this example, OneDrive is expanded showing bar graphs of files per tenant. Also, the SaaS summary report includes summary values 1160 at the top with files with incident, files with DLP violations, files with malware, and externally shared files with DLP violations across all SaaS applications. Further, the SaaS summary report includes a pie chart 1162 showing violations spread across all SaaS applications.

As described herein, the CASB incidents are in relation to objects, such as file, emails, email attachments, etc. FIG. 36 is a screenshot of an assets with incidents view illustrating a file tab. FIG. 37 is a screenshot of the assets with incidents view illustrating an owners tab. FIG. 38 is a screenshot of a popup view illustrating files with incidents for a specific owner. FIG. 39 is a screenshot of the assets with incidents view illustrating a collaborators tab.

FIGS. 36-39 provides summaries across three object level views to answer the most common questions that IT Practitioners have to answer before during the process of discovery and assessment of Asset Exposure for DLP and compliance. For example, FIG. 36 answers these questions with tiles—files with incident, files with DLP violations, files with malware, and externally shared files with DLP violations. With respect to who owns the affected data, FIG. 37 answers with the tiles under the OWNERS tab, e.g., Owners of publicly shared files, Owners of files with unauthorized external collaborators, etc. With respect to who from the outside has access to this affected data, FIG. 39 answers with the tiles under the COLLABORATORS tab, e.g., External collaborators on assets with sensitive data in it. Answering these questions is the key value. Typically, in other solutions, practitioners have to perform a lot of offline analysis to find answers for these. The CASB Object Level Reporting described herein provides these answers right away.

CASB UI Process

Figure 40:
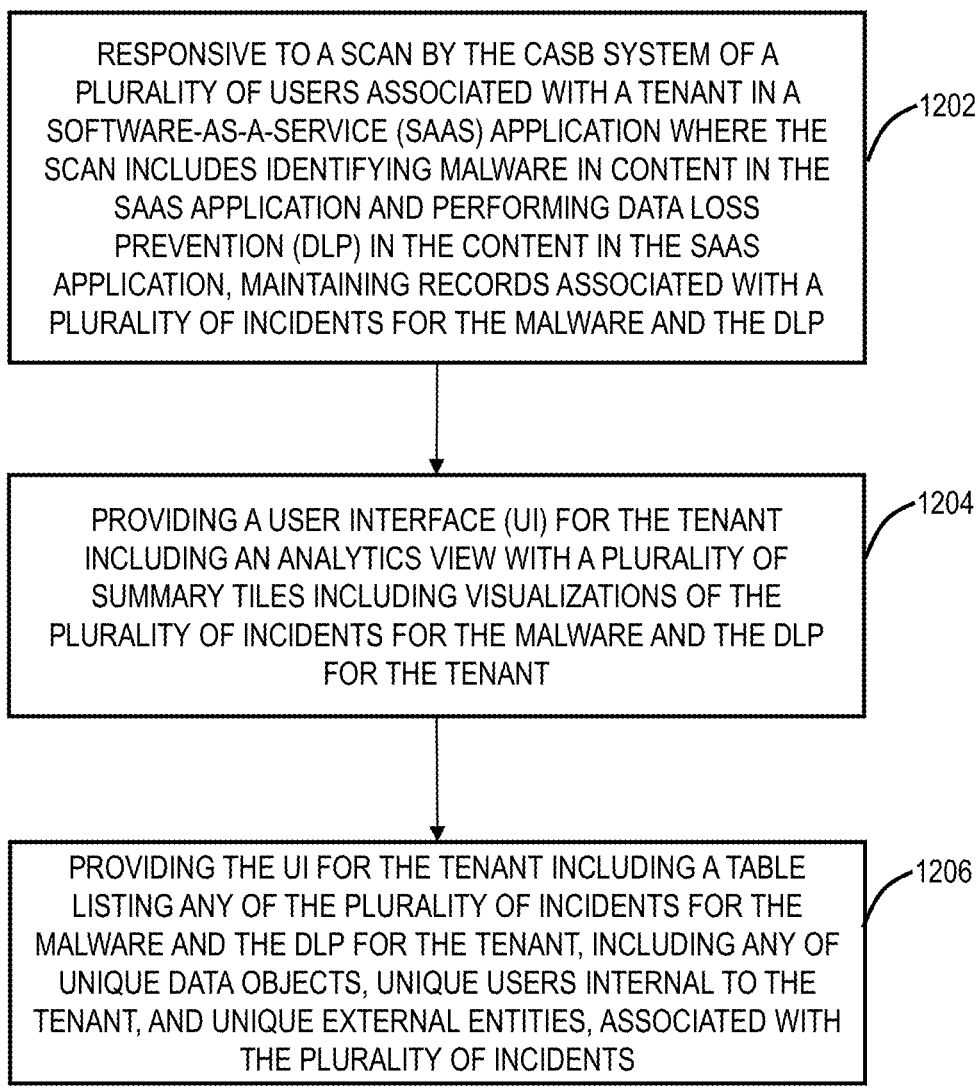
FIG. 40 is a flowchart of a CASB UI process.

FIG. 40 is a flowchart of a CASB UI process 1200. The CASB UI process 1200 can be implemented as a method, in a server 200, and as computer-readable code stored in a non-transitory computer-readable storage medium. The CASB UI process 1200 includes, responsive to a scan by the CASB system of a plurality of users associated with a tenant in a Software-as-a-Service (SaaS) application where the scan includes identifying malware in content in the SaaS application and performing Data Loss Prevention (DLP) in the content in the SaaS application, maintaining records associated with a plurality of incidents for the malware and the DLP (step 1202); providing a User Interface (UI) for the tenant including an analytics view with a plurality of summary tiles including visualizations of the plurality of incidents for the malware and the DLP for the tenant (step 1204); and providing the UI for the tenant including a table listing any of the plurality of incidents for the malware and the DLP for the tenant, including any of unique data objects, unique users internal to the tenant, and unique external entities, associated with the plurality of incidents (step 1206).

The CASB UI process 1200 can further include providing the UI for the tenant to onboard a plurality of SaaS applications including the SaaS application. The CASB UI process 1200 can further include providing the UI for the tenant to configure policies for the DLP and for the malware for the SaaS application. The CASB UI process 1200 can further include, responsive to a selection of any entry in the table, providing a popup listing details associated with the corresponding incident. The SaaS application can be one of a plurality of SaaS applications for the tenant, and wherein the visualizations include a table listing the plurality of incidents associated with the plurality of SaaS applications. The visualizations can include one or more pie charts illustrating the plurality of incidents. The visualizations can include a line chart illustrating the plurality of incidents over time.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming one or more processors associated with a Cloud Access Security Broker (CASB) system to perform steps of:
   responsive to a scan by the CASB system of a plurality of users associated with a tenant in a Software-as-a-Service (SaaS) application where the scan includes identifying malware in content in the SaaS application and performing Data Loss Prevention (DLP) in the content in the SaaS application, maintaining records associated with a plurality of incidents for the malware and the DLP;
   providing a User Interface (UI) for the tenant including an analytics view with a plurality of summary tiles including visualizations of the plurality of incidents for the malware and the DLP for the tenant, wherein the visualizations include charts visualizing splits between DLP violations and malware, DLP violations split by different DPI engines, and malware by threat category; and providing the UI for the tenant including a table listing any of the plurality of incidents for the malware and the DLP for the tenant, wherein each of the plurality of incidents listed in the table include a unique data object, an owner of the unique data object, and one or more external collaborators associated with each of the plurality of incidents.

2. The non-transitory computer-readable storage medium of claim 1, wherein the steps further include providing the UI for the tenant to onboard a plurality of SaaS applications including the SaaS application, wherein the onboarding supports configuring new applications for the CASB system.

3. The non-transitory computer-readable storage medium of claim 1, wherein the steps further include providing the UI for the tenant to configure policies for the DLP and for the malware for the SaaS application.

4. The non-transitory computer-readable storage medium of claim 1, wherein the steps further include responsive to a selection of an owners tab of the UI, providing a listing including any of owners of publicly shared files, owners of files with unauthorized external collaborates, owners of files with malware, owners of files with DLP violations, and owners of files with incidents.

5. The non-transitory computer-readable storage medium of claim 1, wherein the SaaS application is one of a plurality of SaaS applications for the tenant, and wherein the visualizations include a table listing the plurality of incidents associated with the plurality of SaaS applications.

6. The non-transitory computer-readable storage medium of claim 1, wherein the visualizations include one or more pie charts illustrating the plurality of incidents.

7. The non-transitory computer-readable storage medium of claim 1, wherein the visualizations include a line chart illustrating the plurality of incidents over time, the line chart displaying trends for DLP incidents, malware incidents, and a combination thereof.

8. A method comprising:

responsive to a scan by a Cloud Access Security Broker (CASB) system of a plurality of users associated with a tenant in a Software-as-a-Service (SaaS) application where the scan includes identifying malware in content in the SaaS application and performing Data Loss Prevention (DLP) in the content in the SaaS application, maintaining records associated with a plurality of incidents for the malware and the DLP;

providing a User Interface (UI) for the tenant including an analytics view with a plurality of summary tiles including visualizations of the plurality of incidents for the malware and the DLP for the tenant, wherein the visualizations include charts visualizing splits between DLP violations and malware, DLP violations split by different DPI engines, and malware by threat category; and providing the UI for the tenant including a table listing any of the plurality of incidents for the malware and the DLP for the tenant, wherein each of the plurality of incidents listed in the table include a unique data object, an owner of the unique data object, and one or more external collaborators associated with each of the plurality of incidents.

9. The method of claim 8, further comprising providing the UI for the tenant to onboard a plurality of SaaS applications including the SaaS application, wherein the onboarding supports configuring new applications for the CASB system.

10. The method of claim 8, further comprising providing the UI for the tenant to configure policies for the DLP and for the malware for the SaaS application.

11. The method of claim 8, further comprising responsive to a selection of an owners tab of the UI, providing a listing including any of owners of publicly shared files, owners of files with unauthorized external collaborators, owners of files with malware, owners of files with DLP violations, and owners of files with incidents.

12. The method of claim 8, wherein the SaaS application is one of a plurality of SaaS applications for the tenant, and wherein the visualizations include a table listing the plurality of incidents associated with the plurality of SaaS applications.

13. The method of claim 8, wherein the visualizations include one or more pie charts illustrating the plurality of incidents.

14. The method of claim 8, wherein the visualizations include a line chart illustrating the plurality of incidents over time, the line chart displaying trends for DLP incidents, malware incidents, and a combination thereof.

15. A system associated with a Cloud Access Security Broker (CASB) system, comprising:

one or more processors and memory storing instructions that, when executed, cause the one or more processors to responsive to a scan by the CASB system of a plurality of users associated with a tenant in a Software-as-a-Service (Saas) application where the scan includes identifying malware in content in the SaaS application and performing Data Loss Prevention (DLP) in the content in the SaaS application, maintain records associated with a plurality of incidents for the malware and the DLP;

provide a User Interface (UI) for the tenant including an analytics view with a plurality of summary tiles including visualizations of the plurality of incidents for the malware and the DLP for the tenant, wherein the visualizations include charts visualizing splits between DLP violations and malware, DLP violations split by different DPI engines, and malware by threat category; and provide the UI for the tenant including a table listing any of the plurality of incidents for the malware and the DLP for the tenant, wherein each of the plurality of incident listed in the table include a unique data object, an owner of the unique data object, and one or more external collaborators associated with each of the plurality of incidents.

16. The system of claim 15, wherein the instructions that, when executed, further cause the one or more processors to providing the UI for the tenant to onboard a plurality of SaaS applications including the SaaS application, wherein the onboarding supports configuring new applications for the CASB system.

17. The system of claim 15, wherein the instructions that, when executed, further cause the one or more processors to providing the UI for the tenant to configure policies for the DLP and for the malware for the SaaS application.

18. The system of claim 15, wherein the instructions that, when executed, further cause the one or more processors to responsive to a selection of an owners tab of the UI, providing a listing including any of owners of publicly shared files, owners of files with unauthorized external collaborators, owners of files with malware, owners of files with DLP violations, and owners of files with incidents.

19. The system of claim 15, wherein the SaaS application is one of a plurality of SaaS applications for the tenant, and wherein the visualizations include a table listing the plurality of incidents associated with the plurality of SaaS applications.

20. The system of claim 15, wherein the visualizations include one or more pie charts illustrating the plurality of incidents and a line chart illustrating the plurality of incidents over time, the line chart displaying trends for DLP incidents, malware incidents, and a combination thereof.

* * * * *